(12) United States Patent
Uenaka

(10) Patent No.: US 7,453,494 B2
(45) Date of Patent: Nov. 18, 2008

(54) ANTI-SHAKE APPARATUS HAVING MAGNETIC POSITION DETECTORS POSITIONED ON ONE AXIS WITH COMMON INPUT CIRCUITRY

(75) Inventor: Yukio Uenaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 623 days.

(21) Appl. No.: 11/073,604

(22) Filed: Mar. 8, 2005

(65) Prior Publication Data

US 2005/0200712 A1 Sep. 15, 2005

(30) Foreign Application Priority Data

Mar. 9, 2004 (JP) ............................. P2004-065047

(51) Int. Cl.
*H04N 5/228* (2006.01)

(52) U.S. Cl. ............. 348/208.7; 348/208.2; 348/208.11

(58) Field of Classification Search ............. 348/208.1, 348/208.2, 208.4, 208.5, 208.7, 208.11
See application file for complete search history.

(56) References Cited

U.S. PATENT DOCUMENTS

| | | | | |
|---|---|---|---|---|
| 4,356,437 | A * | 10/1982 | Saito et al. ............... | 318/400.2 |
| 5,932,984 | A * | 8/1999 | Murakami et al. .......... | 318/560 |
| 5,974,269 | A | 10/1999 | Sato et al. | |
| 6,781,622 | B1 * | 8/2004 | Sato et al. ................ | 348/208.4 |
| 6,985,176 | B2 * | 1/2006 | Noguchi ................. | 348/208.11 |
| 7,224,893 | B2 * | 5/2007 | Uenaka ....................... | 396/55 |

2003/0067544 A1 4/2003 Wada

FOREIGN PATENT DOCUMENTS

| | | |
|---|---|---|
| JP | 10-142647 | 5/1998 |
| JP | 2002-229090 | 8/2002 |
| JP | 2003-110919 | 4/2003 |

OTHER PUBLICATIONS

U.S. Appl. No. 11/044,010 to Uenaka et al., which was filed Jan. 28, 2005.
U.S. Appl. No. 11/044,055 to Uenaka et al., which was filed Jan. 28, 2005.

(Continued)

*Primary Examiner*—Ngoc-Yen Vu
*Assistant Examiner*—Paul Saunders
(74) *Attorney, Agent, or Firm*—Greenblum & Bernstein, P.L.C.

(57) ABSTRACT

An anti-shake apparatus of a photographing apparatus comprises a movable unit, a fixed unit, and a signal-processing unit. The movable unit has an imaging device and is movable in first and second directions. The fixed unit slidably supports the movable unit in both the first and second directions. The movable unit has a horizontal magnetic-field change-detecting element for detecting a first location, and a vertical magnetic-field change-detecting element for detecting a second location. The signal-processing unit outputs a first detected-position signal, which specifies the first location on the basis of output signals of the horizontal magnetic-field change-detecting element, and outputs a second detected-position signal, which specifies the second location on the basis of output signals of the vertical magnetic-field change-detecting element. Further, the signal-processing unit has a common input circuit which supplies electrical power to the input terminals of the horizontal and vertical magnetic-field change-detecting elements.

10 Claims, 14 Drawing Sheets

OTHER PUBLICATIONS

U.S. Appl. No. 11/044,054 to Uenaka, which was filed Jan. 28, 2005.
U.S. Appl. No. 11/065,577 to Uenaka, which was filed Feb. 25, 2005.
U.S. Appl. No. 11/065,354 to Uenaka et al., which was filed Feb. 25, 2005.
U.S. Appl. No. 11/071,234 to Uenaka, which was filed Mar. 4, 2005.
U.S. Appl. No. 11/071,220 to Uenaka et al., which was filed Mar. 4, 2005.
U.S. Appl. No. 11/071,241 to Uenaka, which was filed Mar. 4, 2005.
U.S. Appl. No. 11/071,242 to Uenaka, which was filed Mar. 4, 2005.
U.S. Appl. No. 11/073,638 to Uenaka et al., which was filed Mar. 8, 2005.
U.S. Appl. No. 11/078,367 to Seo, which was filed Mar. 14, 2005.
English Language Abstract of JP 2002-229090.
English Language Abstract of JP 2003-110919.
English Language Abstract of JP 10-142647.

* cited by examiner

US 7,453,494 B2

ANTI-SHAKE APPARATUS HAVING MAGNETIC POSITION DETECTORS POSITIONED ON ONE AXIS WITH COMMON INPUT CIRCUITRY

BACKGROUND OF THE INVENTION

1. Field of the Invention

The present invention relates to an anti-shake apparatus for a photographing device (apparatus), and in particular to a position-detecting apparatus for a movable unit that includes the imaging device etc., and that can be moved for correcting the hand-shake effect.

2. Description of the Related Art

An anti-shake apparatus for a photographing apparatus is proposed. The anti-shake apparatus corrects for the hand-shake effect by moving a hand-shake correcting lens or an imaging device on a plane that is perpendicular to the optical axis, corresponding to the amount of hand-shake which occurs during imaging.

Japanese unexamined patent publication (KOKAI) No. 2002-229090 discloses an anti-shake apparatus for a photographing apparatus. The anti-shake apparatus performs a moving operation of a movable unit, which includes a hand-shake correcting lens, by using a permanent magnet and a coil, and a position-detecting operation of the movable unit, by using a hall element and a permanent magnet.

However, in the position-detecting operation, supplying electrical power to the input terminals of the horizontal hall element (magnetic-field change-detecting element) for detecting a position of the movable unit in the first direction, and supplying electrical power to the input terminals of the vertical hall element (magnetic-field change-detecting element) for detecting a position of the movable unit in the second direction, is respectively performed by each electrical power circuit.

The first direction is perpendicular to an optical axis of a camera lens of the photographing apparatus. The second direction is perpendicular to the optical axis and the first direction.

SUMMARY OF THE INVENTION

Therefore, an object of the present invention is to reduce the size of the circuit of the signal processing unit for a plurality of magnetic-field change-detecting elements which are used for detecting the position of the movable unit in two directions being perpendicular to each other, for the anti-shake apparatus.

According to the present invention, an anti-shake apparatus of a photographing apparatus comprises a movable unit, a fixed unit, and a signal-processing unit.

The movable unit has one of an imaging device and a hand-shake correcting lens, and can be moved in first and second directions. The first direction is perpendicular to an optical axis of a camera lens of the photographing apparatus. The second direction is perpendicular to the optical axis and the first direction.

The fixed unit slidably supports the movable unit in both the first and second directions.

One of the movable unit and the fixed unit has a magnetic-field change-detecting unit which has a horizontal magnetic-field change-detecting element for detecting a position of the movable unit in the first direction, as a first location, and a vertical magnetic-field change-detecting element for detecting a position of the movable unit in the second direction, as a second location.

The signal-processing unit outputs a first detected-position signal, which specifies the first location on the basis of output signals of the horizontal magnetic-field change-detecting element, and outputs a second detected-position signal, which specifies the second location on the basis of output signals of the vertical magnetic-field change-detecting element, and has a common input circuit which supplies electrical power to input terminals of the horizontal and vertical magnetic-field change-detecting elements.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
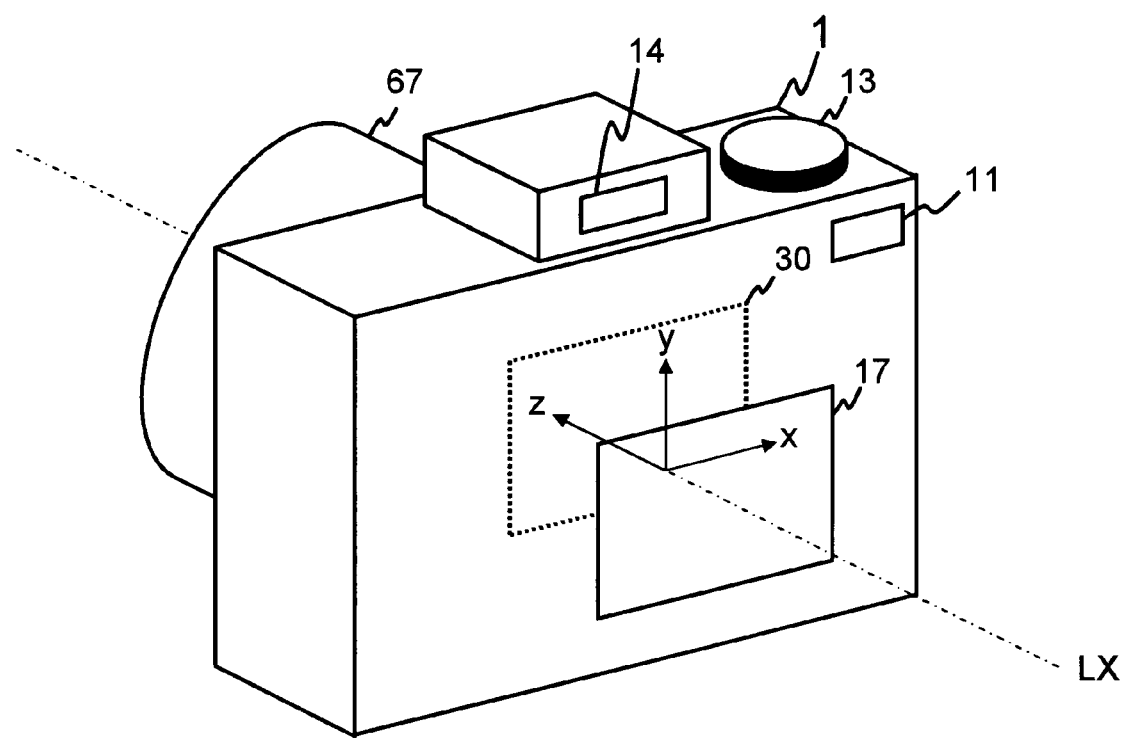
FIG. 1 is a perspective view of a photographing apparatus of the first and second embodiments viewed from the back side of the photographing apparatus.

The present invention is described below with reference to the embodiments shown in the drawings. In these embodiments, the photographing apparatus 1 is a digital camera. The photographing apparatus 1 has an optical axis LX.

In order to explain the direction in these embodiments, a first direction x, a second direction y, and a third direction z are defined (see FIG. 1). The first direction x is a horizontal direction which is perpendicular to the optical axis LX. The second direction y is a vertical direction which is perpendicular to the optical axis LX and the first direction x. The third direction z is a horizontal direction which is parallel to the optical axis LX and perpendicular to both the first direction x and the second direction y.

A first embodiment is explained by using FIGS. 1 to 13.

Figure 4:
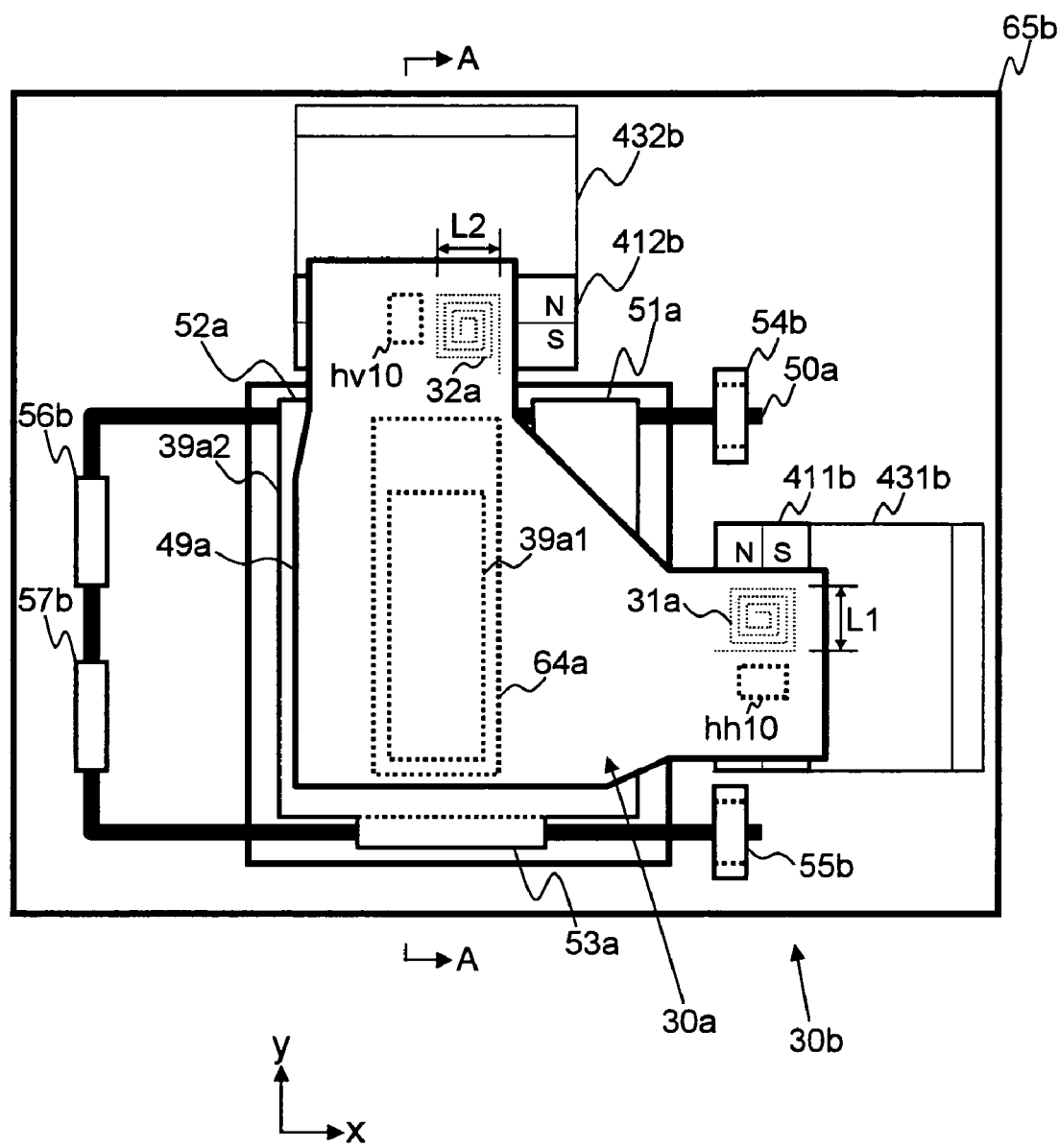
FIG. 4 is a figure showing the construction of the anti-shake unit in the first and second embodiments.
Figure 5:
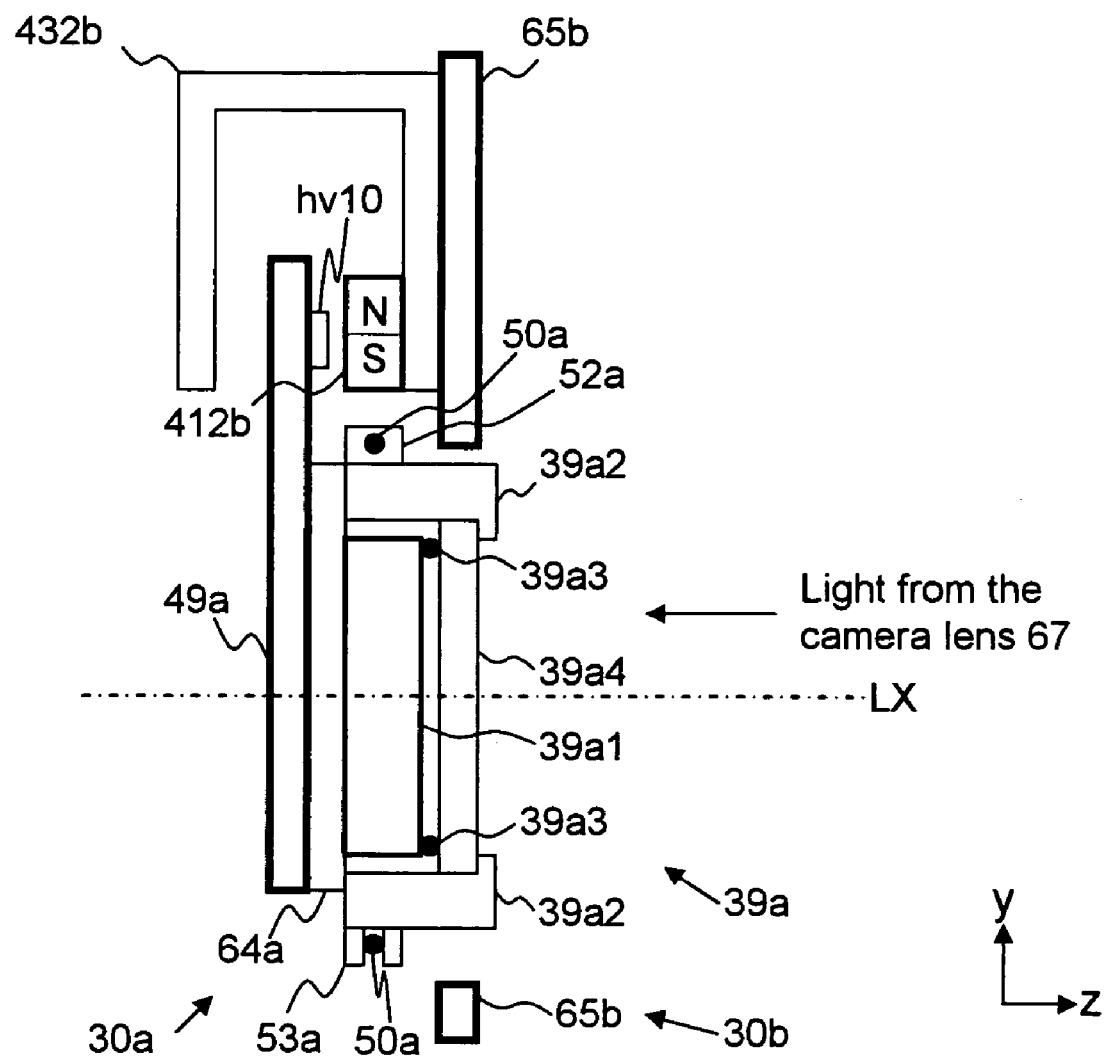
FIG. 5 is a view along line A-A of FIG. 4.

FIG. 5 shows a construction diagram of the section along line A-A of FIG. 4.

Figure 2:
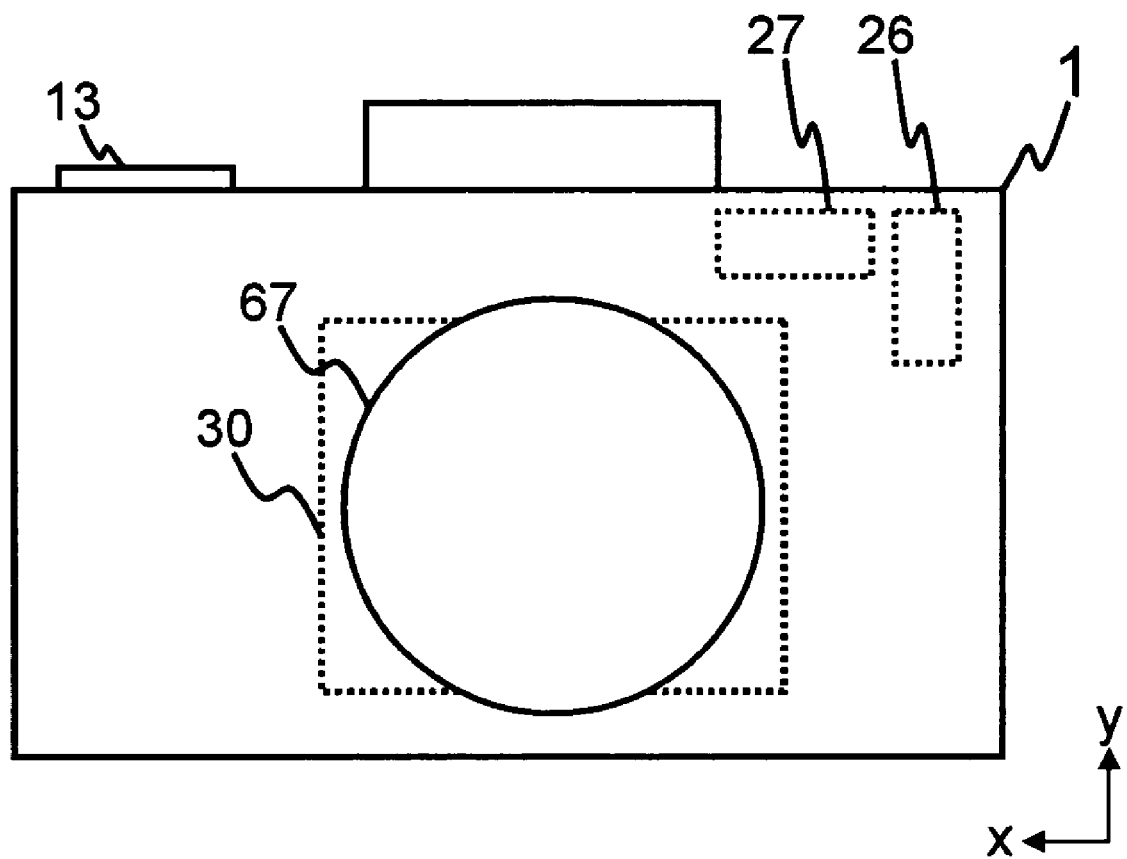
FIG. 2 is a front view of the photographing apparatus in the first and second embodiments.
Figure 3:
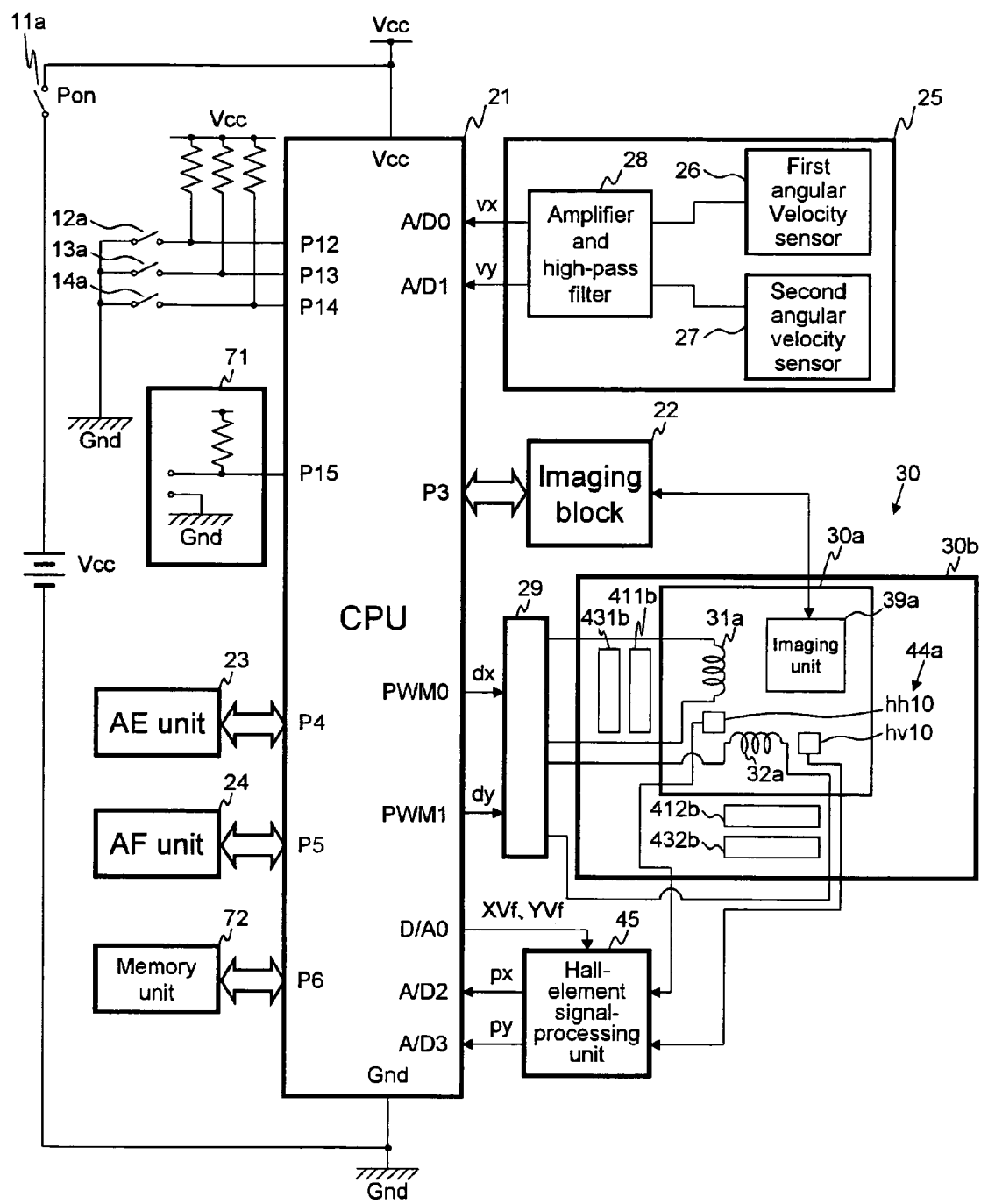
FIG. 3 is a circuit construction diagram of the photographing apparatus in the first and second embodiments.

The imaging part of the photographing apparatus 1 comprises a Pon button 11, a Pon switch 11a, a photometric switch 12a, a release button 13, a release switch 13a, a LCD monitor 17, a CPU 21, an imaging block 22, an AE (automatic exposure) unit 23, an AF (automatic focusing) unit 24, an imaging unit 39a in the anti-shake unit 30, and a camera lens 67 (see FIGS. 1, 2, and 3).

Whether the Pon switch 11a is in the on state or the off state, is determined by a state of the Pon button 11, so that the ON/OFF states of the photographing apparatus 1 are changed corresponding to the ON/OFF states of the Pon switch 11a.

The photographic subject image is taken as an optical image through the camera lens 67 by the imaging block 22, which drives the imaging unit 39a, so that the image, which is taken, is indicated on the LCD monitor 17. The photographic subject image can be optically observed by the optical finder (not depicted).

When the release button 13 is half pushed by the operator, the photometric switch 12a changes to the on state, so that the photometric operation, the AF sensing operation, and the focusing operation are performed.

When the release button 13 is fully pushed by the operator, the release switch 13a changes to the on state, so that the imaging operation is performed, and the image, which is taken, is stored.

The CPU 21 is a control apparatus, which controls each part of the photographing apparatus 1 regarding the imaging operation, and controls each part of the photographing apparatus 1 regarding the anti-shake operation. The anti-shake operation controls the movement of the movable unit 30a and controls detecting the position of the movable unit 30a.

The imaging block 22 drives the imaging unit 39a. The AE unit 23 performs the photometric operation for the photographic subject, calculates the photometric values, and calculates the aperture value and the time length of the exposure time, which is needed for imaging, corresponding to the photometric values. The AF unit 24 performs the AF sensing operation, and performs the focusing operation, which is needed for the imaging, corresponding to the result of the AF sensing operation. In the focusing operation, the position of the camera lens 67 is moved in the optical axis LX direction.

The anti-shaking part of the photographing apparatus 1 comprises an anti-shake button 14, an anti-shake switch 14a, a CPU 21, an angular velocity detecting unit 25, a driver circuit 29, an anti-shake unit 30, a hall-element signal-processing unit 45, the camera lens 67, an adjusting unit 71, and a memory unit 72.

When the anti-shake button 14 is fully pushed by the operator, the anti-shake switch 14a changes to the on state, so that the anti-shake operation is performed where the angular velocity detecting unit 25 and the anti-shake unit 30 are driven, at every predetermined time interval, independently of the other operations which include the photometric operation etc. When the anti-shake switch 14a is in the on state, in other words in the anti-shake mode, the parameter IS is set to 1 (IS=1). When the anti-shake switch 14a is not in the on state, in other words in the non anti-shake mode, the parameter IS is set to 0 (IS=0) In the first embodiment, the predetermined time interval is 1 ms.

The various output commands corresponding to the input signals of these switches are controlled by the CPU 21.

The information regarding whether the photometric switch 12a is in the on state or in the off state, is input to port P12 of the CPU 21 as a 1-bit digital signal. The information regarding whether the release switch 13a is in the on state or in the off state, is input to port P13 of the CPU 21 as a 1-bit digital signal. The information regarding whether the anti-shake switch 14a is in the on state or in the off state, is input to port P14 of the CPU 21 as a 1-bit digital signal.

The imaging block 22 is connected to port P3 of the CPU 21 for inputting and outputting signals. The AE unit 23 is connected to port P4 of the CPU 21 for inputting and outputting signals. The AF unit 24 is connected to port P5 of the CPU 21 for inputting and outputting signals.

The adjusting unit 71 is a mode switch for switching between a normal use mode and an adjusting mode.

In the adjusting mode, an initial-adjustment operation is performed, which adjusts a detecting-resolution in the A/D converting operation for the first and second detected-position signals px and py, which are analogue signals and are obtained when detecting the position of the movable unit 30a using the hall element unit 44a. The initial-adjustment operation has first and second initial-adjustment operations, which are described later.

When the mode switch is set to the on state, the photographing apparatus 1 is set in the adjusting mode. When the mode switch is set to the off state, the adjusting mode is canceled and the photographing apparatus 1 is set in the normal use mode.

The memory unit 72 is a non-volatile memory, such as an EEPROM etc., which stores the optimized horizontal hall-element current-value xDi and the optimized vertical hall-element current-value yDi. The memory unit 72 is electrically rewritable, so that a content, which is stored in the memory unit 72, is not deleted even if the memory unit 72 is set to the off state.

The adjusting unit 71 is connected to port P15 of the CPU 21 for inputting and outputting signals. When the Lo signal is output from the adjusting unit 71 to the port P15 of the CPU 21, the initial-adjustment operation (the first and second initial-adjustment operations) is performed. The memory unit 72 is connected to port P6 of the CPU 21 for inputting and outputting signals.

Next, the details of the input and output relationship with the CPU 21 for the angular velocity unit 25, the driver circuit 29, the anti-shake unit 30, and the hall-element signal-processing unit 45 are explained.

The angular velocity unit 25 has a first angular velocity sensor 26, a second angular velocity sensor 27, and a combined amplifier and high-pass filter circuit 28. The first angular velocity sensor 26 detects the velocity-component in the first direction x of the angular velocity of the photographing apparatus 1, at every predetermined time interval (1 ms). The second angular velocity sensor 27 detects the velocity-component in the second direction y of the angular velocity of the photographing apparatus 1, at every predetermined time interval (1 ms).

The combined amplifier and high-pass filter circuit 28 amplifies the signal regarding the first direction x of the angular velocity (the velocity-component in the first direction x of the angular velocity), reduces a null voltage and a panning of the first angular velocity sensor 26, and outputs the analogue signal to the A/D converter A/D 0 of the CPU 21 as a first angular velocity vx.

The combined amplifier and high-pass filter circuit 28 amplifies the signal regarding the second direction y of the angular velocity (the velocity-component in the second direction y of the angular velocity), reduces a null voltage and a panning of the second angular velocity sensor 27, and outputs the analogue signal to the A/D converter A/D 1 of the CPU 21 as a second angular velocity vy.

The CPU 21 converts the first angular velocity vx which is input to the A/D converter A/D 0 and the second angular velocity vy which is input to the A/D converter A/D 1 to digital signals (A/D converting operation), and calculates the hand-shake quantity, which occurs in the predetermined time (1 ms), on the basis of the converted digital signals and the converting coefficient, where focal distance is considered. Accordingly, the CPU 21 and the angular velocity detecting unit 25 have a function which calculates the hand-shake quantity.

The CPU 21 calculates the position S of the imaging unit 39*a* (the movable unit 30*a*), which should be moved to, corresponding to the hand-shake quantity which is calculated, for the first direction x and the second direction y. The location in the first direction x of the position S is defined as sx, and the location in the second direction y of the position S is defined as sy. The movement of the movable unit 30*a*, which includes the imaging unit 39*a*, is performed by using electromagnetic force and is described later. The driving force D, which drives the driver circuit 29 in order to move the movable unit 30*a* to the position S, has a first PWM duty dx as the driving-force component in the first direction x, and a second PWM duty dy as the driving-force component in the second direction y.

The anti-shake unit 30 is an apparatus which corrects the hand-shake effect, by moving the imaging unit 39*a* to the position S, by canceling lag of the photographic subject image on the imaging surface of the imaging device 39*a*1, and by stabilizing the photographing subject image that reaches the imaging surface of the imaging device 39*a*1.

The anti-shake unit 30 has a movable unit 30*a*, which includes the imaging unit 39*a*, and a fixed unit 30*b*. Or, the anti-shake unit 30 is composed of a driving part which moves the movable unit 30*a* by electro-magnetic force to the position S, and a position-detecting part which detects the position of the movable unit 30*a* (a detected-position P).

The size and the direction of the electro-magnetic force are determined by the size and the direction of the current which flows in the coil, and the size and the direction of the magnetic-field of the magnet.

The driving of the movable unit 30*a* of the anti-shake unit 30, is performed by the driver circuit 29 which has the first PWM duty dx input from the PWM 0 of the CPU 21 and has the second PWM duty dy input from the PWM 1 of the CPU 21. The detected-position P of the movable unit 30*a* either before moving or after moving, which is moved by driving the driver circuit 29, is detected by the hall element unit 44*a* and the hall-element signal-processing unit 45.

Information of a first location in the first direction x for the detected-position P, in other words a first detected-position signal px is input to the A/D converter A/D 2 of the CPU 21. The first detected-position signal px is an analogue signal, and is converted to a digital signal through the A/D converter A/D 2 (A/D converting operation). The first location in the first direction x for the detected-position P, after the A/D converting operation, is defined as pdx, corresponding to the first detected-position signal px.

Information of a second location in the second direction y for the detected-position P, in other words a second detected-position signal py is input to the A/D converter A/D 3 of the CPU 21. The second detected-position signal py is an analogue signal, and is converted to a digital signal through the A/D converter A/D 3 (A/D converting operation). The second location in the second direction y for the detected-position P, after the A/D converting operation, is defined as pdy, corresponding to the second detected-position signal py.

The PID (Proportional Integral Differential) control is performed on the basis of the data for the detected-position P (pdx, pdy) and the data for the position S (sx, sy) which should be moved to.

The movable unit 30*a* has a first driving coil 31*a*, a second driving coil 32*a*, an imaging unit 39*a*, a hall element unit 44*a*, a movable circuit board 49*a*, a shaft for movement 50*a*, a first bearing unit for horizontal movement 51*a*, a second bearing unit for horizontal movement 52*a*, a third bearing unit for horizontal movement 53*a*, and a plate 64*a* (see FIGS. 4 and 5).

The fixed unit 30*b* has a position-detecting magnet unit, a first position-detecting and driving yoke 431*b*, a second position-detecting and driving yoke 432*b*, a first bearing unit for vertical movement 54*b*, a second bearing unit for vertical movement 55*b*, a third bearing unit for vertical movement 56*b*, a fourth bearing unit for vertical movement 57*b*, and a base board 65*b*. The position-detecting magnet unit has a first position-detecting and driving magnet 411*b* and a second position-detecting and driving magnet 412*b*.

The shaft for movement 50*a* of the movable unit 30*a* has a channel shape when viewed from the third direction z. The first, second, third, and fourth bearing units for vertical movement 54*b*, 55*b*, 56*b*, and 57*b* are attached to the base board 65*b* of the fixed unit 30*b*. The shaft for movement 50*a* is slidably supported in the vertical direction (the second direction y), by the first, second, third, and fourth bearing units for vertical movement 54*b*, 55*b*, 56*b*, and 57*b*.

The first and second bearing units for vertical movement 54*b* and 55*b* have slots which extend in the second direction y.

Therefore, the movable unit 30*a* can move relative to the fixed unit 30*b*, in the vertical direction (the second direction y).

The shaft for movement 50*a* is slidably supported in the horizontal direction (the first direction x), by the first, second, and third bearing units for horizontal movement 51*a*, 52*a*, and 53*a* of the movable unit 30*a*. Therefore, the movable unit 30*a*, except for the shaft for movement 50*a*, can move relative to the fixed unit 30*b* and the shaft for movement 50*a*, in the horizontal direction (the first direction x).

Figure 6:
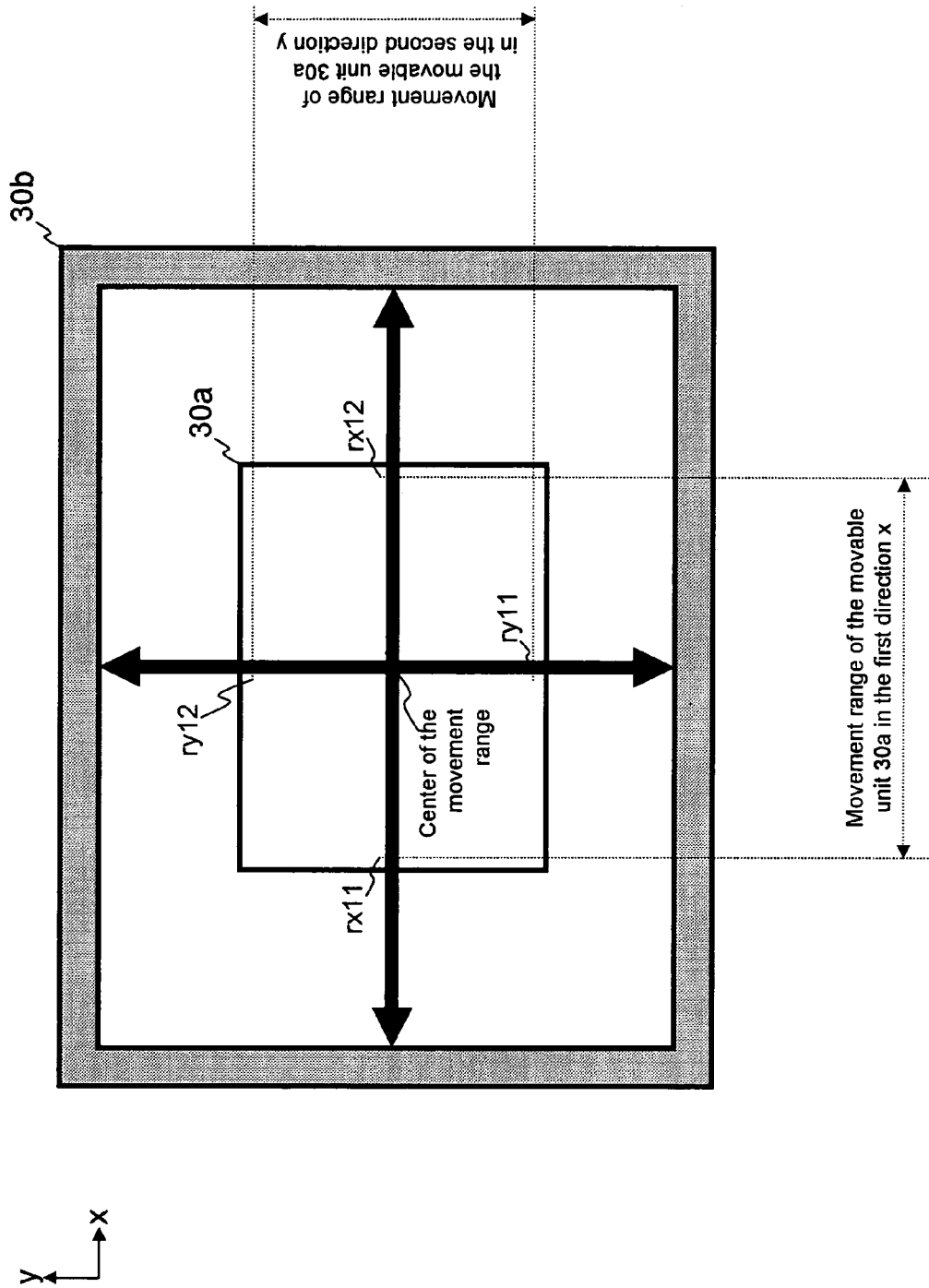
FIG. 6 is a plane view showing a movement range of the movable unit.

The movement range of the movable unit 30*a* means the movement range of the center of the movable unit 30*a*. One of the edge points in the movement range of the movable unit 30*a* in the first direction x, is a first horizontal edge-point rx11, another of the edge points in the movement range of the movable unit 30*a* in the first direction x, is a second horizontal edge-point rx12, one of the edge points in the movement range of the movable unit 30*a* in the second direction y, is a first vertical edge-point ry11, and another of the edge points in the movement range of the movable unit 30*a* in the second direction y, is a second vertical edge-point ry12 (see FIG. 6). In FIG. 6, the forms of the movable unit 30a and the fixed unit 30b are simplified.

When the center area of the imaging device 39a1 is located on the optical axis LX of the camera lens 67, the location relation between the movable unit 30a and the fixed unit 30b is set up so that the movable unit 30a is located at the center of its movement range in both the first direction x and the second direction y, in order to utilize the full size of the imaging range of the imaging device 39a1.

A rectangle shape, which forms the imaging surface of the imaging device 39a1, has two diagonal lines. In the first embodiment, the center of the imaging device 39a1 is the crossing point of these two diagonal lines.

The imaging unit 39a, the plate 64a, and the movable circuit board 49a are attached, in this order along the optical axis LX direction, viewed from the side of the camera lens 67. The imaging unit 39a has an imaging device 39a1 (such as a CCD or a COMS etc.), a stage 39a2, a holding unit 39a3, and an optical low-pass filter 39a4. The stage 39a2 and the plate 64a hold and urge the imaging device 39a1, the holding unit 39a3, and the optical low-pass filter 39a4 in the optical axis LX direction.

The first, second, and third bearing units for horizontal movement 51a, 52a, and 53a are attached to the stage 39a2. The imaging device 39a1 is attached to the plate 64a, so that positioning of the imaging device 39a1 is performed where the imaging device 39a1 is perpendicular to the optical axis LX of the camera lens 67. In the case where the plate 64a is made of a metallic material, the plate 64a has the effect of radiating heat from the imaging device 39a1, by contacting the imaging device 39a1.

The first driving coil 31a, the second driving coil 32a, and the position-detecting magnet 41a are attached to the movable circuit board 49a.

The first driving coil 31a forms a seat and a spiral shape coil pattern. The coil pattern of the first driving coil 31a has lines which are parallel to either the first direction x or the second direction y, where the movable unit 30a which includes the first driving coil 31a, is moved in the first direction x, by a first electro-magnetic force. The lines which are parallel to the second direction y, are used for moving the movable unit 30a in the first direction x. The lines which are parallel to the second direction y, have a first effective length L1.

The first electro-magnetic force occurs on the basis of the current direction of the first driving coil 31a and the magnetic-field direction of the first position-detecting and driving magnet 411b.

The second driving coil 32a forms a seat and a spiral shape coil pattern. The coil pattern of the second driving coil 32a has lines which are parallel to either the first direction x or the second direction y, where the movable unit 30a which includes the second driving coil 32a, is moved in the second direction y, by a second electro-magnetic force. The lines which are parallel to the first direction x, are used for moving the movable unit 30a in the second direction y. The lines which are parallel to the first direction x, have a second effective length L2.

The second electro-magnetic force occurs on the basis of the current direction of the second driving coil 32a and the magnetic-field direction of the second position-detecting and driving magnet 412b.

The first and second driving coils 31a and 32a are connected with the driver circuit 29 which drives the first and second driving coils 31a and 32a through the flexible circuit board (not depicted). The first PWM duty dx is input to the driver circuit 29 from the PWM 0 of the CPU 21, and the second PWM duty dy is input to the driver circuit 29 from the PWM 1 of the CPU 21. The driver circuit 29 supplies power to the first driving coil 31a corresponding to the value of the first PWM duty dx, and to the second driving coil 32a corresponding to the value of the second PWM duty dy, to drive the movable unit 30a.

The first position-detecting and driving magnet 411b is attached to the movable unit side of the fixed unit 30b, where the first position-detecting and driving magnet 411b faces the first driving coil 31a and the horizontal hall element hh10 in the third direction z.

The second position-detecting and driving magnet 412b is attached to the movable unit side of the fixed unit 30b, where the second position-detecting and driving magnet 412b faces the second driving coil 32a and the vertical hall element hv10 in the third direction z.

The first position-detecting and driving magnet 411b is attached to the first position-detecting and driving yoke 431b, under the condition where the N pole and S pole are arranged in the first direction x. The first position-detecting and driving yoke 431b is attached to the base board 65b of the fixed unit 30b, on the side of the movable unit 30a, in the third direction z.

The length of the first position-detecting and driving magnet 411b in the second direction y, is longer in comparison with the first effective length L1 of the first driving coil 31a. The magnetic-field which influences the first driving coil 31a and the horizontal hall element hh10, is not changed during movement of the movable unit 30a in the second direction y.

The second position-detecting and driving magnet 412b is attached to the second position-detecting and driving yoke 432b, under the condition where the N pole and S pole are arranged in the second direction y. The second position-detecting and driving yoke 432b is attached to the base board 65b of the fixed unit 30b, on the side of the movable unit 30a, in the third direction z.

The length of the second position-detecting and driving magnet 412b in the first direction x, is longer in comparison with the second effective length L2 of the second driving coil 32a. The magnetic-field which influences the second driving coil 32a and the vertical hall element hv10, is not changed during movement of the movable unit 30a in the first direction x.

The first position-detecting and driving yoke 431b is made of a soft magnetic material, and forms a square-u-shape channel when viewed from the second direction y. The first position-detecting and driving magnet 411b, the first driving coil 31a, and the horizontal hall element hh10 are inside the channel of the first position-detecting and driving yoke 431b.

The side of the first position-detecting and driving yoke 431b, which contacts the first position-detecting and driving magnet 411b, prevents the magnetic-field of the first position-detecting and driving magnet 411b from leaking to the surroundings.

The other side of the first position-detecting and driving yoke 431b (which faces the first position-detecting and driving magnet 411b, the first driving coil 31a, and the movable circuit board 49a) raises the magnetic-flux density between the first position-detecting and driving magnet 411b and the first driving coil 31a, and between the first position-detecting and driving magnet 411b and the horizontal hall element hh10.

The second position-detecting and driving yoke 432b is made of a soft magnetic material, and forms a square-u-shape channel when viewed from the first direction x. The second position-detecting and driving magnet 412b, the second driving coil 32a, and the vertical hall element hv10 are inside the channel of the second position-detecting and driving yoke 432b.

The side of the second position-detecting and driving yoke 432b, which contacts the second position-detecting and driving magnet 412b, prevents the magnetic-field of the second position-detecting and driving magnet 412b from leaking to the surroundings.

The other side of the second position-detecting and driving yoke 432b (which faces the second position-detecting and driving magnet 412b, the second driving coil 32a, and the movable circuit board 49a) raises the magnetic-flux density between the second position-detecting and driving magnet 412b and the second driving coil 32a, and between the second position-detecting and driving magnet 412b and the vertical hall element hv10.

The hall element unit 44a is a one-axis hall element which has two hall elements that are magnetoelectric converting elements (magnetic-field change-detecting elements) using the Hall Effect. The hall element unit 44a detects the first detected-position signal px which is used for specifying the first location in the first direction x for the present position P of the movable unit 30a, and the second detected-position signal py which is used for specifying the second location in the second direction y for the present position P of the movable unit 30a.

One of the two hall elements is a horizontal hall element hh10 for detecting the first location in the first direction x of the movable unit 30a, so that the other is a vertical hall element hv10 for detecting the second location in the second direction y of the movable unit 30a (see FIG. 4).

The horizontal hall element hh10 is attached to the movable circuit board 49a of the movable unit 30a, under the condition where the horizontal hall element hh10 faces the first position-detecting and driving magnet 411b of the fixed unit 30b, in the third direction z.

The vertical hall element hv10 is attached to the movable circuit board 49a of the movable unit 30a, under the condition where the vertical hall element hv10 faces the second position-detecting and driving magnet 412b of the fixed unit 30b, in the third direction z.

The base board 65b is a plate state member which becomes the base for attaching the first position-detecting and driving yoke 431b etc., and is arranged being parallel to the imaging surface of the imaging device 39a1.

In the first embodiment, the base board 65b is arranged at the side nearer to the camera lens 67 in comparison with the movable circuit board 49a, in the third direction z. However, the movable circuit board 49a may be arranged at the side nearer to the camera lens 67 in comparison with the base board 65b. In this case, the first and second driving coils 31a and 32a, and the hall element unit 44a are arranged on the opposite side of the movable circuit board 49a to the camera lens 67, so that the first and second position-detecting and driving magnets 411b and 412b are arranged on the same side of the base board 65b as the camera lens 67.

The hall-element signal-processing unit 45 detects a horizontal potential-difference x10 between output terminals of the horizontal hall element hh10, based on an output signal of the horizontal hall element hh10.

The hall-element signal-processing unit 45 outputs the first detected-position signal px, which specifies the first location in the first direction x of the movable unit 30a, to the A/D converter A/D 2 of the CPU 21, on the basis of the horizontal potential-difference x10.

The hall-element signal-processing unit 45 detects a vertical potential-difference y10 between output terminals of the vertical hall element hv10, based on an output signal of the vertical hall element hv10.

The hall-element signal-processing unit 45 outputs the second detected-position signal py, which specifies the second location in the second direction y of the movable unit 30a, to the A/D converter A/D 3 of the CPU 21, on the basis of the vertical potential-difference y10.

The value of the current (the optimized horizontal hall-element current-value xDi) which flows through the input terminals of the horizontal hall element hh10 (and the vertical hall element hv10) when detecting the first location in the first direction x of the movable unit 30a, is determined by the first initial-adjustment operation.

The value of the current (the optimized vertical hall-element current-value yDi) which flows through the input terminals of the vertical hall element hv10 (and the horizontal hall element hh10) when detecting the second location in the second direction y of the movable unit 30a, is determined by the second initial-adjustment operation.

In the first initial-adjustment operation, a first detecting-resolution of the A/D converter A/D 2 for A/D converting the first detected-position signal px, is adjusted and improved. Or, the width between the minimum and maximum values of the first detected-position signal px is maximized, in the movement range of the movable unit 30a, and in the A/D converting range of the CPU 21.

In the second initial-adjustment operation, a second detecting-resolution of the A/D converter A/D 3 for A/D converting the second detected-position signal py, is adjusted and improved. Or, the width between the minimum and maximum values of the second detected-position signal py is maximized, in the movement range of the movable unit 30a, and in the A/D converting range of the CPU 21.

The first and second initial-adjustment operations are performed in the adjusting mode, where the Lo signal is output from the adjusting unit 71 to the port P15 of the CPU 21.

Specifically, in the first initial-adjustment operation, first and second horizontal hall-element current-values xDi1 and xDi2 are calculated, so that the first optimized horizontal hall-element current-value xsDi1 which is the smaller value of the first and second horizontal hall-element current-values xDi1 and xDi2, is determined and stored in the memory unit 72.

The first horizontal hall-element current-value xDi1 is a value of the current which flows through the input terminals of the horizontal hall element hh10 (and the vertical hall element hv10), when the output value of the first detected-position signal px becomes a maximum value in the A/D converting range of the CPU 21, and when the center of the movable unit 30a contacts the first horizontal edge-point rx11.

The second horizontal hall-element current-value xDi2 is a value of the current which flows through the input terminals of the horizontal hall element hh10 (and the vertical hall element hv10), when the output value of the first detected-position signal px becomes a minimum value in the A/D converting range of the CPU 21, and when the center of the movable unit 30a contacts the second horizontal edge-point rx12.

Specifically, in the second initial-adjustment operation, first and second vertical hall-element current-values yDi1 and yDi2 are calculated, so that the first optimized vertical hall-element current-value ysDi1 which is the smaller value of the first and second vertical hall-element current-values yDi1 and yDi2, is determined and stored in the memory unit 72.

The first vertical hall-element current-value yDi1 is a value of the current which flows through the input terminals of the vertical hall element hv10 (and the horizontal hall element hh10), when the output value of the second detected-position signal py becomes a maximum value in the A/D converting range of the CPU 21, and when the center of the movable unit 30a contacts the first vertical edge-point ry11.

The second vertical hall-element current-value yDi2 is a value of the current which flows through the input terminals of the vertical hall element hv10 (and the horizontal hall element hh10), when the output value of the second detected-position signal py becomes a minimum value in the A/D converting range of the CPU 21, and when the center of the movable unit 30a contacts the second vertical edge-point ry12.

Therefore, the optimized horizontal hall-element current-value xDi and the vertical hall-element current-value yDi can be easily calculated by the first and second initial-adjustment operations.

The first voltage XVf, corresponding to the optimized horizontal hall-element current-value xDi, or the second voltage YVf, corresponding to the optimized vertical hall-element current-value yDi, is applied to the circuit 456 of the hall-element signal-processing unit 45, from the D/A converter D/A 0 of the CPU 21.

Figure 7:
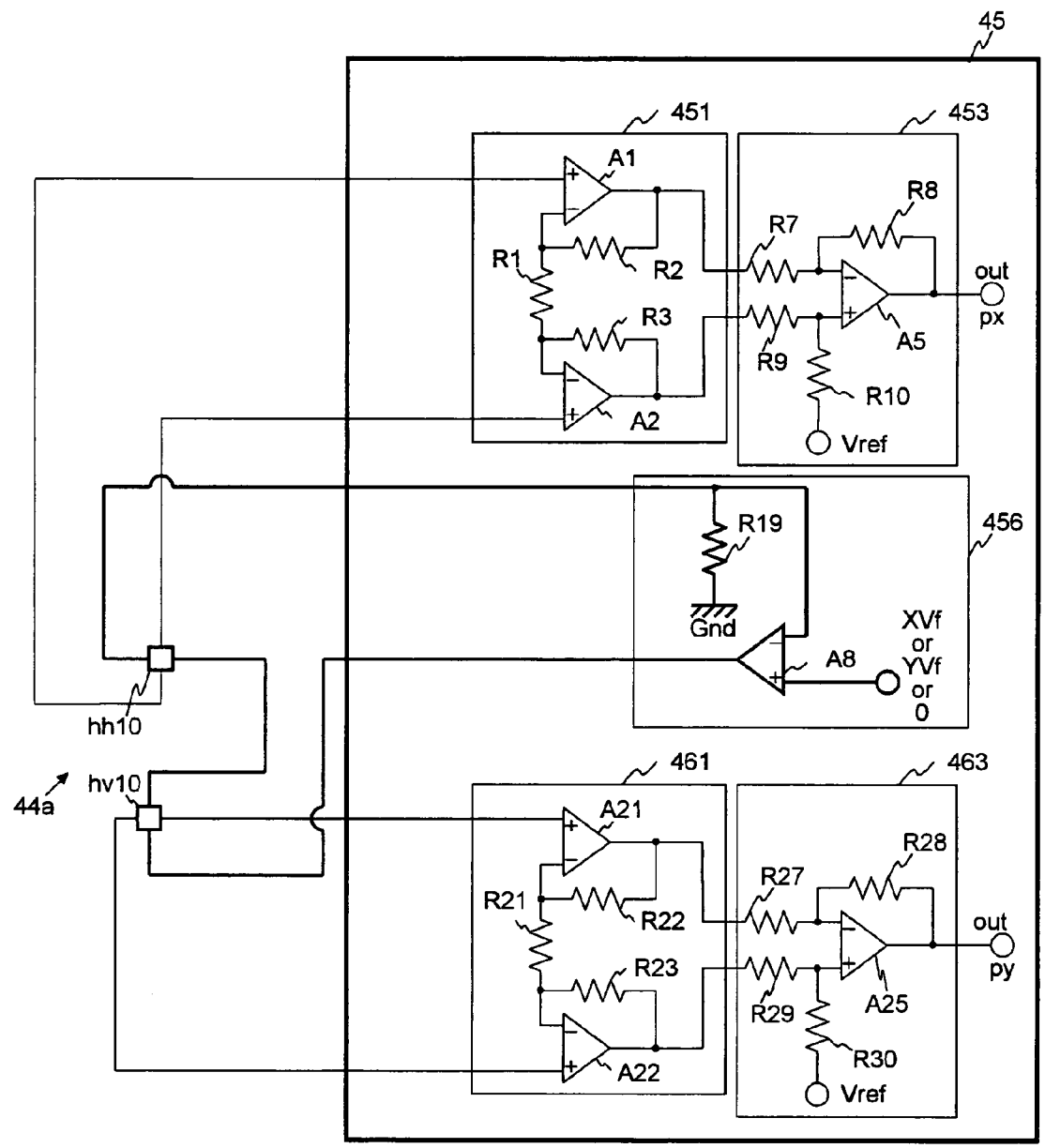
FIG. 7 is a circuit construction diagram of the circuit for the one-axis hall element and the hall-element signal-processing circuit, in the first embodiment.

The circuit construction regarding input/output signals of the horizontal hall element hh10, in the hall-element signal-processing unit 45, and the circuit construction regarding input/output signals of the vertical hall element hv10, in the hall-element signal-processing unit 45 are explained using FIG. 7.

The hall-element signal-processing unit 45 has a circuit 451 and a circuit 453 for controlling the output of the horizontal hall element hh10, and has a circuit 461 and a circuit 463 for controlling the output of the vertical hall element hv10, and has a circuit 456 for commonly controlling the input to the horizontal hall element hh10 and the vertical hall element hv10.

Both output terminals of the horizontal hall element hh10 are connected with the circuit 451, so that the circuit 451 is connected with the circuit 453.

The circuit 451 is a differential amplifier circuit which amplifies the signal difference between the output terminals of the horizontal hall element hh10.

The circuit 453 is a subtracting amplifier circuit which calculates the horizontal potential-difference x10 (the hall output voltage) on the basis of the difference between the amplified signal difference from the circuit 451 and a reference voltage Vref, and which calculates the first detected-position signal px by multiplying a first amplification rate AA1 by the horizontal potential-difference x10.

The circuit 451 has a resistor R1, a resistor R2, a resistor R3, an operational amplifier A1, and an operational amplifier A2. The operational amplifier A1 has an inverting input terminal, a non-inverting input terminal, and an output terminal. The operational amplifier A2 has an inverting input terminal, a non-inverting input terminal, and an output terminal.

One of the output terminals of the horizontal hall element hh10 is connected with the non-inverting input terminal of the operational amplifier A1, so that the other terminal of the horizontal hall element hh10 is connected with the non-inverting input terminal of the operational amplifier A2.

The inverting input terminal of the operational amplifier A1 is connected with the resistors R1 and R2, so that the inverting input terminal of the operational amplifier A2 is connected with the resistors R1 and R3.

The output terminal of the operational amplifier A1 is connected with the resistor R2 and the resistor R7 in the circuit 453. The output terminal of the operational amplifier A2 is connected with the resistor R3 and the resistor R9 in the circuit 453.

The circuit 453 has a resistor R7, a resistor R8, a resistor R9, a resistor R10, and an operational amplifier A5. The operational amplifier A5 has an inverting input terminal, a non-inverting input terminal, and an output terminal.

The inverting input terminal of the operational amplifier A5 is connected with the resistors R7 and R8. The non-inverting input terminal of the operational amplifier A5 is connected with the resistors R9 and R10. The output terminal of the operational amplifier A5 is connected with the resistor R8. The first detected-position signal px, which is obtained by multiplying the first amplification rate AA1, by the horizontal potential-difference x10, is output from the output terminal of the operational amplifier A5. One of the terminals of the resistor R10 is connected with the power supply whose voltage is the reference voltage Vref.

The values of the resistors R2 and R3 are the same. The values of the resistors R7 and R9 are the same. The values of the resistors R8 and R10 are the same.

The first amplification rate AA1 is based on the values of the resistors R7~R10 (the ratio of the value of the resistor R7 to the value of the resistor R8).

The operational amplifiers A1 and A2 are the same type of amplifier.

The circuit 456 has a resistor R19 and an operational amplifier A8. The operational amplifier A8 has an inverting input terminal, a non-inverting input terminal, and an output terminal.

The inverting input terminal of the operational amplifier A8 is connected with the resistor R19 and one of the input terminals of the horizontal hall element hh10.

The other input terminal of the horizontal hall element hh10 is connected with one of the input terminals of the vertical hall element hv10, so that the input terminal of the horizontal hall element hh10 and the input terminal of the vertical hall element hv10 are connected in series. The output terminal of the operational amplifier A8 is connected with the other input terminal of the vertical hall element hv10. One of the terminals of the resistor R19 is grounded.

However, the inverting input terminal of the operational amplifier A8 may be connected with one of the input terminals of the vertical hall element hv10, the other input terminal of the vertical hall element hv10 may be connected with one of the input terminals of the horizontal hall element hh10, and the output terminal of the operational amplifier A8 may be connected with the other input terminal of the horizontal hall element hh10.

The potential of the non-inverting input terminal of the operational amplifier A8 is set at the first voltage XVf corresponding to the optimized horizontal hall-element current-value xDi, or at the second voltage YVf corresponding to the optimized vertical hall-element current-value yDi (of the current that respectively flows through the input terminals of the horizontal hall element hh10 and the vertical hall element hv10), or 0.

The value of the first voltage XVf is obtained by multiplying the optimized horizontal hall-element current-value xDi by the value of the resistor R19, so that the value of the second voltage YVf is obtained by multiplying the optimized vertical hall-element current-value yDi by the value of the resistor R19.

Accordingly, the circuit 456 is the common input circuit which supplies electrical power to the input terminals of the horizontal hall element hh10 and the vertical hall element hv10.

Both output terminals of the vertical hall element hv10 are connected with the circuit 461, so that the circuit 461 is connected with the circuit 463.

The circuit 461 is a differential amplifier circuit which amplifies the signal difference between the output terminals of the vertical hall element hv10.

The circuit 463 is a subtracting amplifier circuit which calculates the vertical potential-difference y10 (the hall output voltage) on the basis of the difference between the amplified signal difference from the circuit 461 and a reference voltage Vref, and which calculates the second detected-position signal py by multiplying a second amplification rate AA2 by the vertical potential-difference y10.

The circuit 461 has a resistor R21, a resistor R22, a resistor R23, an operational amplifier A21, and an operational amplifier A22. The operational amplifier A21 has an inverting input terminal, a non-inverting input terminal, and an output terminal. The operational amplifier A22 has an inverting input terminal, a non-inverting input terminal, and an output terminal.

One of the output terminals of the vertical hall element hv10 is connected with the non-inverting input terminal of the operational amplifier A21, so that the other terminal of the vertical hall element hv10 is connected with the non-inverting input terminal of the operational amplifier A22.

The inverting input terminal of the operational amplifier A21 is connected with the resistors R21 and R22, so that the inverting input terminal of the operational amplifier A22 is connected with the resistors R21 and R23.

The output terminal of the operational amplifier A21 is connected with the resistor R22 and the resistor R27 in the circuit 463. The output terminal of the operational amplifier A22 is connected with the resistor R23 and the resistor R29 in the circuit 463.

The circuit 463 has a resistor R27, a resistor R28, a resistor R29, a resistor R30, and an operational amplifier A25. The operational amplifier A25 has an inverting input terminal, a non-inverting input terminal, and an output terminal.

The inverting input terminal of the operational amplifier A25 is connected with the resistors R27 and R28. The non-inverting input terminal of the operational amplifier A25 is connected with the resistors R29 and R30. The output terminal of the operational amplifier A25 is connected with the resistor R28. The second detected-position signal py, which is obtained by multiplying the second amplification rate AA2, by the vertical potential-difference y10, is output from the output terminal of the operational amplifier A25. One of the terminals of the resistor R30 is connected with the power supply whose voltage is the reference voltage Vref.

The values of the resistors R22 and R23 are the same. The values of the resistors R27 and R29 are the same. The values of the resistors R28 and R30 are the same.

The second amplification rate AA2 is based on the values of the resistors R27~R30 (the ratio of the value of the resistor R27 to the value of the resistor R28).

The operational amplifiers A21 and A22 are the same type of amplifier.

In the first embodiment, supplying electrical power to the input terminals of the horizontal hall element hh10 and the vertical hall element hv10 is performed by the circuit 456 (only one electrical power circuit). Therefore, the size of the circuit can be reduced and simplified in comparison with when supplying electrical power to the input terminals of the horizontal hall element hh10 and supplying electrical power to the input terminals of the vertical hall element hv10 is performed by separate electrical power circuits.

Further, the number of cables which connect between the input terminals of the hall element and the electrical power circuit of the hall-element signal-processing unit can be decreased by two, in comparison with when supplying electrical power to the input terminals of the horizontal hall element and supplying electrical power to the input terminals of the vertical hall element is performed by separate electrical power circuits.

In the case where the movable unit 30a (not the fixed unit 30b) has the hall element unit 44a as in the first embodiment, the effect that restrains stresses (external forces) on the movable unit 30a when driving (moving) the movable unit 30a, can be obtained by decreasing the number of cables which connect between the input terminals of the horizontal and vertical hall elements hh10 and hv10, and the electrical power circuit (the circuit 456) of the hall-element signal-processing unit 45.

Detecting the first location in the first direction x of the movable unit 30a and detecting the second location in the second direction y of the movable unit 30a can be performed at the same time. However, in this case, the value of the current which flows through the input terminals of the horizontal hall element hh10 is the same as the value of the current which flows through the input terminals of the vertical hall element hv10, so that the detecting-resolution can not be optimized for both the A/D converters A/D 2 and A/D 3.

Therefore, detecting the first location in the first direction x of the movable unit 30a is performed where the detecting-resolution is adjusted to be the same as the first detecting-resolution of the A/D converter A/D 2, so that detecting the second location in the second direction y of the movable unit 30a is performed where the detecting-resolution is adjusted to be the same as the second detecting-resolution of the A/D converter A/D 3, separately viewed from the time, in the first embodiment.

In this case, that is, when detecting the first and second locations at separate times, the A/D converters A/D 2 and A/D 3 may be integrated, so that the first and second detected-position signals px and py may be output to one A/D converter (A/D 2 or A/D 3) of the CPU 21.

The value of the current which flows through the input terminals of the horizontal hall element hh10 (and the vertical hall element hv10), is set to the optimized horizontal hall-element current-value xDi, when detecting the first location in the first direction x of the movable unit 30a.

The optimized horizontal hall-element current-value xDi is determined by the first initial-adjustment operation, which adjusts the first detecting-resolution when the first detected-position signal px is A/D converted by the A/D converter A/D 2.

The value of the current which flows through the input terminals of the vertical hall element hv10 (and the horizontal hall element hh10), is set to the optimized vertical hall-element current-value yDi, when detecting the second location in the second direction y of the movable unit 30a.

The optimized vertical hall-element current-value yDi is determined by the second initial-adjustment operation, which adjusts the second detecting-resolution when the second detected-position signal py is A/D converted by the A/D converter A/D 3.

Next, the first and second initial-adjustment operations are explained.

Figure 8:
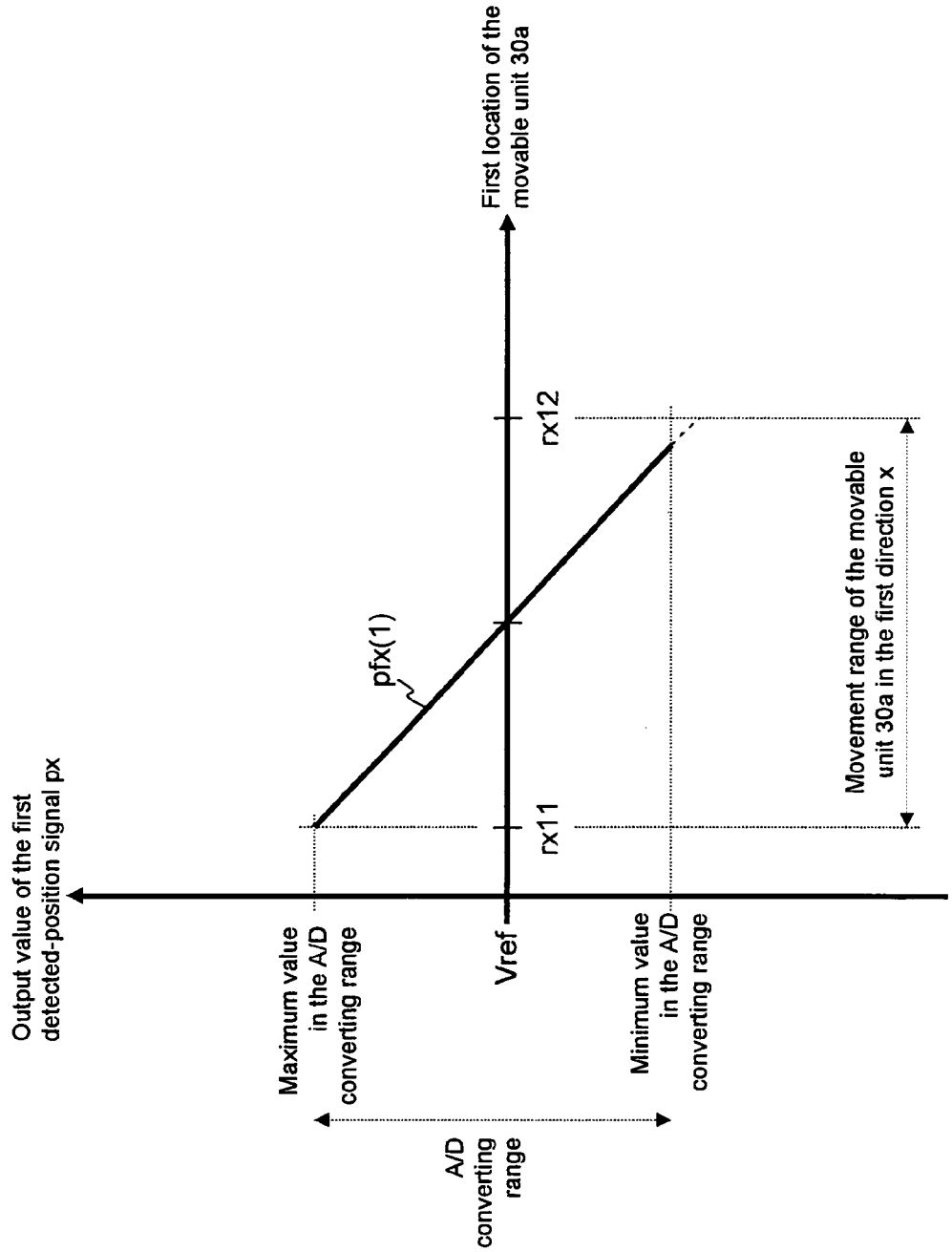
FIG. 8 shows a relationship between the first location in the first direction of the movable unit and the output value of the first detected-position signal, when the center of the movable unit contacts the first horizontal edge-point, and when the value of the current (the first horizontal hall-element current-value) which flows through the input terminals of the horizontal hall element, is adjusted, where the output value of the first detected-position signal is the same as the maximum value in the A/D converting range of the A/D converter of the CPU.
Figure 9:
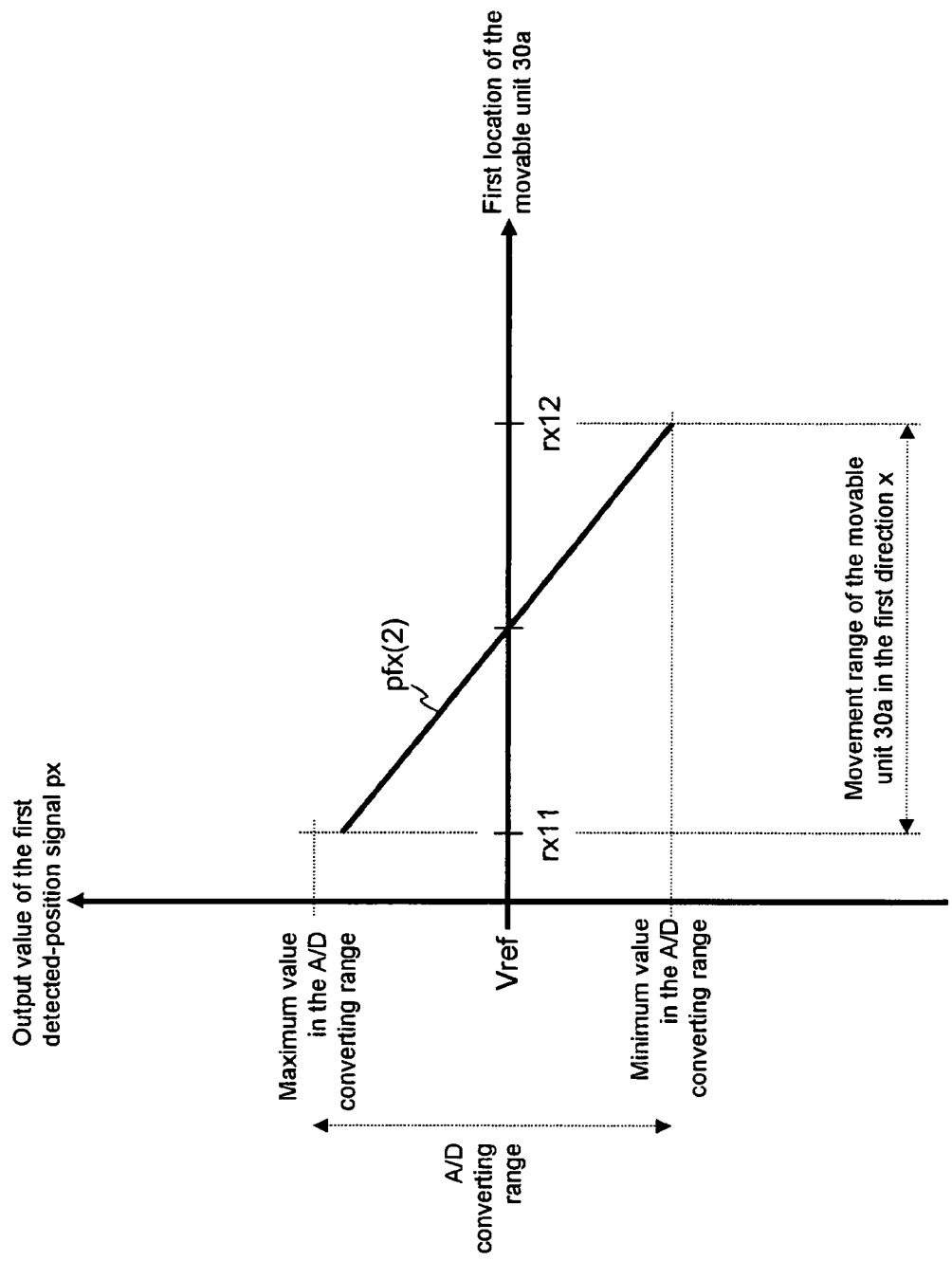
FIG. 9 shows a relationship between the first location in the first direction of the movable unit and the output value of the first detected-position signal, when the center of the movable unit contacts the second horizontal edge-point, and when the value of the current (the second horizontal hall-element current-value) which flows through the input terminals of the horizontal hall element, is adjusted, where the output value of the first detected-position signal is the same as the minimum value in the A/D converting range of the A/D converter of the CPU.

Specifically, the first initial-adjustment operation is explained by using FIGS. 8 and 9.

FIG. 8 shows a relationship between the first location in the first direction x of the movable unit 30a and the output value of the first detected-position signal px, when the center of the movable unit 30a contacts the first horizontal edge-point rx11, and when the value of the current (the first horizontal hall-element current-value xDi1), which flows through the input terminals of the horizontal hall element hh10 (and the vertical hall element hv10), is adjusted where the output value of the first detected-position signal px is the same as the maximum value in the A/D converting range of the A/D converter A/D 2 of the CPU 21.

A first line pfx(1) in FIG. 8 is composed of a thick line and a broken line. The broken line part of the first line pfx(1) shows a condition where the output value of the first detected-position signal px is under the minimum value in the A/D converting range of the A/D converter A/D 2 of the CPU 21, so that an accurate position detecting operation can not be performed, when the center of the movable unit 30a contacts the second horizontal edge-point rx12.

FIG. 9 shows a relationship between the first location in the first direction x of the movable unit 30a and the output value of the first detected-position signal px, when the center of the movable unit 30a contacts the second horizontal edge-point rx12, and when the value of the current (the second horizontal hall-element current-value xDi2), which flows through the input terminals of the horizontal hall element hh10 (and the vertical hall element hv10), is adjusted where the output value of the first detected-position signal px is the same as the minimum value in the A/D converting range of the A/D converter A/D 2 of the CPU 21.

A second line pfx(2) in FIG. 9 is composed of a thick line. The thick line of the second line pfx(2) shows a condition where the output value of the first detected-position signal px is not over the maximum value in the A/D converting range of the A/D converter A/D 2 of the CPU 21, so that an accurate position detecting operation can be performed, when the center of the movable unit 30a contacts the first horizontal edge-point rx11.

Accordingly, the accurate position detecting operation can be performed in the movement-range of the movable unit 30a in the first direction x.

The first detected-position signal px is a functional of a first magnetic-flux density B1 between the horizontal hall element hh10, and the first position-detecting and driving magnet 411b, and a value of the current which flows through the input terminals of the horizontal hall elements hh10 (and the vertical hall element hh10).

The second detected-position signal py is a functional of a second magnetic-flux density B2 between the vertical hall element hv10, and second position-detecting and driving magnet 412, and a value of the current which flows through the input terminals of the vertical hall elements hv10 (and the horizontal hall element hh10).

It is judged whether the first horizontal hall-element current-value xDi1 is smaller than the second horizontal hall-element current-value xDi2, so that the smaller value of the first and second horizontal hall-element current-values xDi1 and xDi2, is determined as the optimized horizontal hall-element current-value xDi.

In this example which is shown in FIGS. 8 and 9, the second horizontal hall-element current-value xDi2 is smaller than the first horizontal hall-element current-value xDi1, so that the second horizontal hall-element current-value xDi2 is determined as the optimized horizontal hall-element current-value xDi.

Similarly, the second initial-adjustment operation is performed, so that the optimized vertical hall-element current-value yDi is determined (not depicted).

When the movable unit 30a is located at the center of its movement range in both the first direction x and the second direction y, and when the output value of the first detected-position signal px agrees with the reference voltage Vref, the first and second horizontal hall-element current-values xDi1 and xDi2 are the same. Or, when a value of the current which flows through the input terminals of the horizontal hall element hh10 (and the vertical hall element hv10), is set under the condition where an output value of the first detected-position signal px when the center of the movable unit 30a contacts the first horizontal edge-point rx11, agrees with the maximum value in the A/D converting range of the A/D converter A/D 2 of the CPU 21, an output value of the first detected-position signal px when the center of the movable unit 30a contacts the second horizontal edge-point rx12, agrees with the minimum value in the A/D converting range of the A/D converter A/D 2 of the CPU 21.

However, in order to make the output value of the first detected-position signal px strictly agree with the reference voltage Vref, when the movable unit 30a is located at the center of its movement range, an additional adjustment, which considers mechanical gaps of the anti-shake unit 30 and error in the values of the resistors of the hall-element signal-processing unit 45, is needed. A relationship between the second detected-position signal py and the first and second vertical hall-element current-values yDi1 and yDi2, is similar to that between the first detected-position signal px and the first and second horizontal hall-element current-values xDi1 and xDi2 which is described above.

In the first embodiment, the optimized horizontal hall-element current-value xDi can be calculated without the strict agreement between the output value of the first detected-position signal px and the reference voltage Vref. Similarly, the optimized vertical hall-element current-value yDi can be calculated without the strict agreement between the output value of the second detected-position signal py and the reference voltage Vref.

Further, because the optimized horizontal and optimized vertical hall-element current-values xDi and yDi are stored in the memory unit 72, these values are not deleted even if the photographing apparatus 1 (the memory unit 72) is set to the off state (power off). Accordingly, the first and second initial-adjustment operations may be performed only one time, in order for the CPU 21 to read the optimized horizontal and optimized vertical hall-element current-values xDi and yDi.

Figure 10:
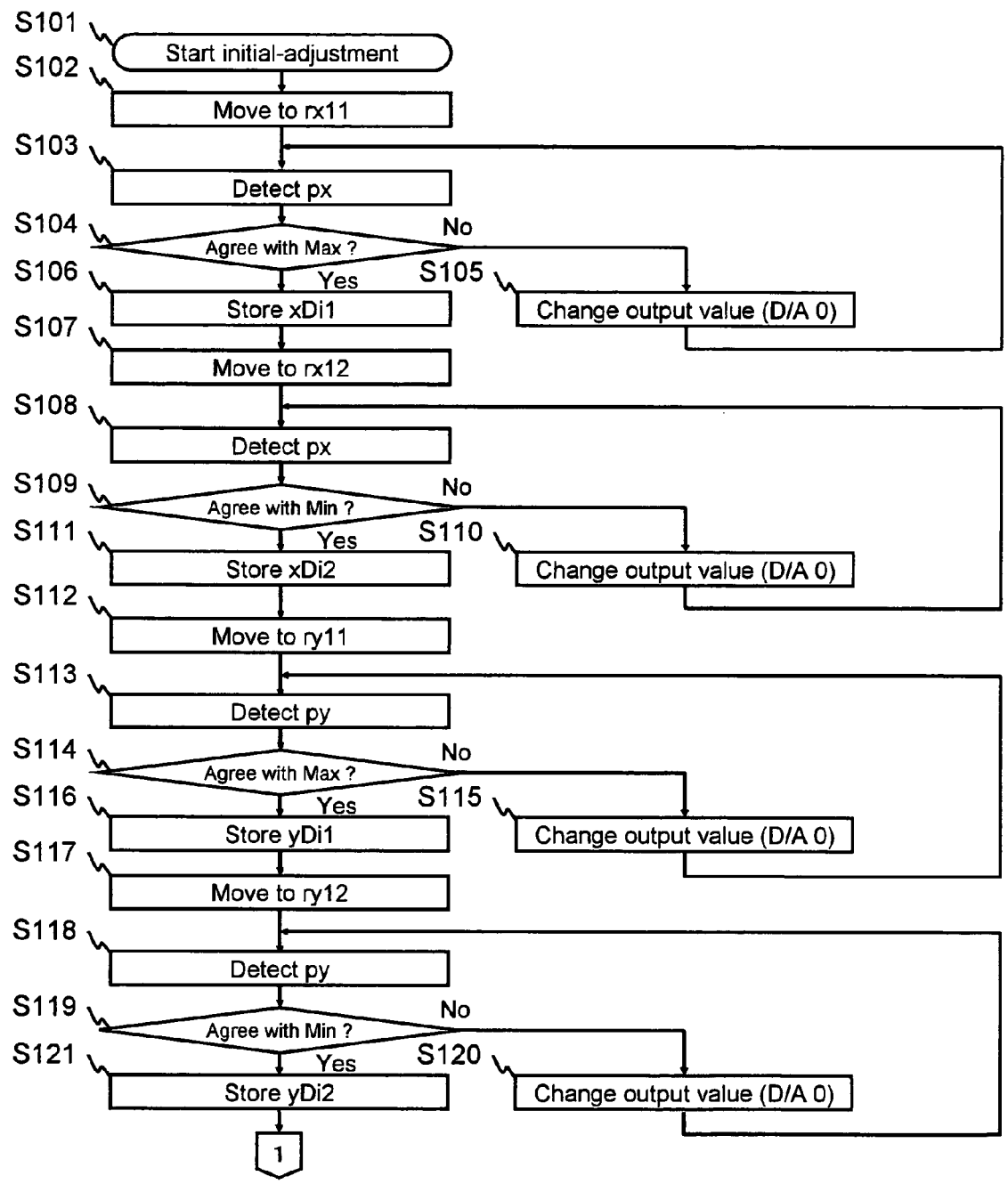
FIG. 10 is a flowchart that shows the first half part of the first and second initial-adjustment operations.
Figure 11:
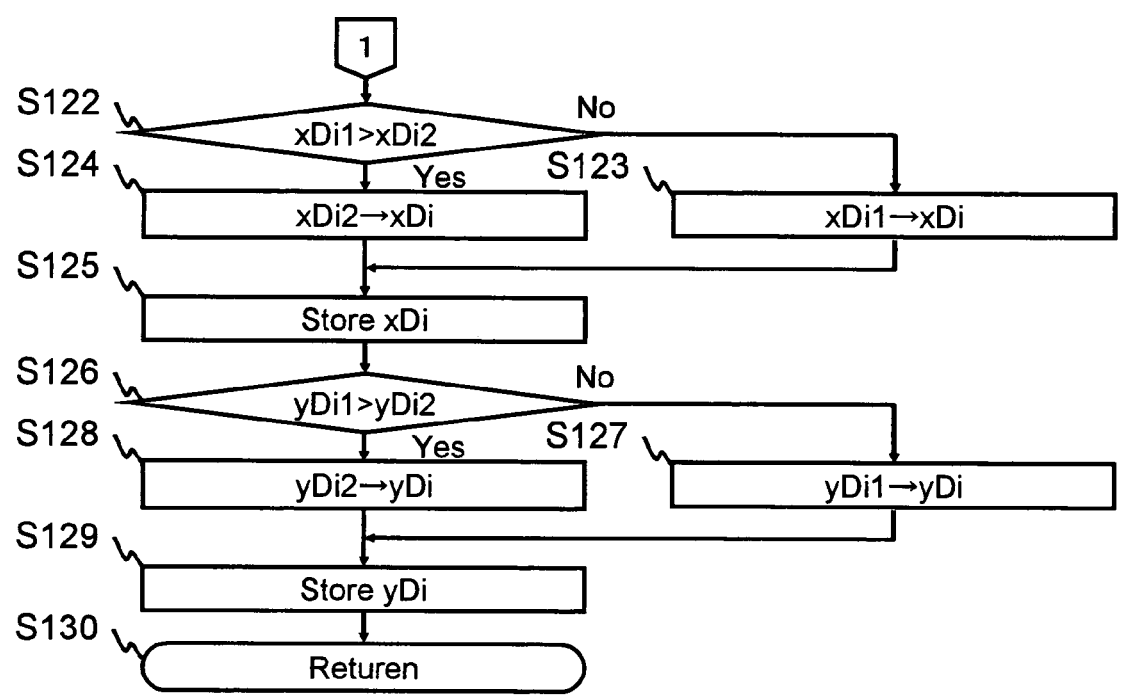
FIG. 11 is a flowchart that shows the second half part of the first and second initial-adjustment operations.

Next, the flow of the first and second initial-adjustment operations is explained by using flowcharts in FIGS. 10 and 11.

In step S101, the adjusting unit 71 is set to the on state, so that the photographing apparatus 1 is set in the adjusting mode, and the first and second initial-adjustment operations are started.

In step S102, the first PWM duty dx is input to the driver circuit 29 from the PWM 0 of the CPU 21, so that the movable unit 30a is moved to where the center of the movable unit 30a contacts the first horizontal edge-point rx11. In step S103, the first detected-position signal px at this time, is detected and is input to the A/D converter A/D 2 of the CPU 21.

In step S104, it is judged whether the output value of the first detected-position signal px agrees with the maximum value in the A/D converting range of the A/D converter A/D 2 of the CPU 21.

When it is judged that the output value of the first detected-position signal px does not agree with the maximum value in the A/D converting range of the A/D converter A/D 2 of the CPU 21, the output value, which is output to the hall-element signal-processing unit 45, from the D/A converter D/A 0 of the CPU 21, is changed, so that the flow is returned to step S103, in step S105.

When it is judged that the output value of the first detected-position signal px agrees with the maximum value in the A/D converting range of the A/D converter A/D 2 of the CPU 21, the value of the current (the first horizontal hall-element current-value xDi1), which flows through the input terminals of the horizontal hall element hh10 (and the vertical hall element hv10) at this time, is temporarily stored in the CPU 21 etc, in step S106.

In step S107, the first PWM duty dx is input to the driver circuit 29 from the PWM 0 of the CPU 21, so that the movable unit 30a is moved to where the center of the movable unit 30a contacts the second horizontal edge-point rx12. In step S108, the first detected-position signal px at this time, is detected and is input to the A/D converter A/D 2 of the CPU 21.

In step S109, it is judged whether the output value of the first detected-position signal px agrees with the minimum value in the A/D converting range of the A/D converter A/D 2 of the CPU 21.

When it is judged that the output value of the first detected-position signal px does not agree with the minimum value in the A/D converting range of the A/D converter A/D 2 of the CPU 21, the output value, which is output to the hall-element signal-processing unit 45, from the D/A converter D/A 0 of the CPU 21, is changed, so that the flow is returned to step S108, in step S110.

When it is judged that the output value of the first detected-position signal px agrees with the minimum value in the A/D converting range of the A/D converter A/D 2 of the CPU 21, the value of the current (the second horizontal hall-element current-value xDi2), which flows through the input terminals of the horizontal hall element hh10 (and the vertical hall element hv10) at this time, is temporarily stored in the CPU 21 etc, in step S111.

In step S112, the second PWM duty dy is input to the driver circuit 29 from the PWM 1 of the CPU 21, so that the movable unit 30a is moved to where the center of the movable unit 30a contacts the first vertical edge-point ry11. In step S113, the second detected-position signal py at this time, is detected and is input to the A/D converter A/D 3 of the CPU 21.

In step S114, it is judged whether the output value of the second detected-position signal py agrees with the maximum value in the A/D converting range of the A/D converter A/D 3 of the CPU 21.

When it is judged that the output value of the second detected-position signal py does not agree with the maximum value in the A/D converting range of the A/D converter A/D 3 of the CPU 21, the output value, which is output to the hall-element signal-processing unit 45, from the D/A converter D/A 0 of the CPU 21, is changed, so that the flow is returned to step S113, in step S115.

When it is judged that the output value of the second detected-position signal py agrees with the maximum value in the A/D converting range of the A/D converter A/D 3 of the CPU 21, the value of the current (the first vertical hall-element current-value yDi1), which flows through the input terminals of the vertical hall element hv10 (and the horizontal hall element hh10) at this time, is temporarily stored in the CPU 21 etc, in step S116.

In step S117, the second PWM duty dy is input to the driver circuit 29 from the PWM 1 of the CPU 21, so that the movable unit 30a is moved to where the center of the movable unit 30a contacts the second vertical edge-point ry12. In step S118, the second detected-position signal py at this time, is detected and is input to the A/D converter A/D 3 of the CPU 21.

In step S119, it is judged whether the output value of the second detected-position signal py agrees with the minimum value in the A/D converting range of the A/D converter A/D 3 of the CPU 21.

When it is judged that the output value of the second detected-position signal py does not agree with the minimum value in the A/D converting range of the A/D converter A/D 3 of the CPU 21, the output value, which is output to the hall-element signal-processing unit 45, from the D/A converter D/A 0 of the CPU 21, is changed, so that the flow is returned to step S118, in step S120.

When it is judged that the output value of the second detected-position signal py agrees with the minimum value in the A/D converting range of the A/D converter A/D 3 of the CPU 21, the value of the current (the second vertical hall-element current-value yDi2), which flows through the input terminals of the vertical hall element hv10 (the horizontal hall element hh10) at this time, is temporarily stored in the CPU 21 etc, in step S121.

In step S122, it is judged whether the first horizontal hall-element current-value xDi1 is larger than the second horizontal hall-element current-value xDi2.

When it is judged that the first horizontal hall-element current-value xDi1 is not larger than the second horizontal hall-element current-value xDi2, the optimized horizontal hall-element current-value xDi is set to the first horizontal hall-element current-value xDi1, in step S123.

When it is judged that the first horizontal hall-element current-value xDi1 is larger than the second horizontal hall-element current-value xDi2, the optimized horizontal hall-element current-value xDi is set to the second horizontal hall-element current-value xDi2, in step S124.

In step S125, the optimized horizontal hall-element current-value xDi is stored in the memory unit 72, so that the first initial-adjustment operation is finished.

In step S126, it is judged whether the first vertical hall-element current-value yDi1 is larger than the second vertical hall-element current-value yDi2.

When it is judged that the first vertical hall-element current-value yDi1 is not larger than the second vertical hall-element current-value yDi2, the optimized vertical hall-element current-value yDi is set to the first vertical hall-element current-value yDi1, in step S127.

When it is judged that the first vertical hall-element current-value yDi1 is larger than the second vertical hall-element current-value yDi2, the optimized vertical hall-element current-value yDi is set to the second vertical hall-element current-value yDi2, in step S128.

In step S129, the optimized vertical hall-element current-value yDi is stored in the memory unit 72. In step S130, the second initial-adjustment operation is finished.

Figure 12:
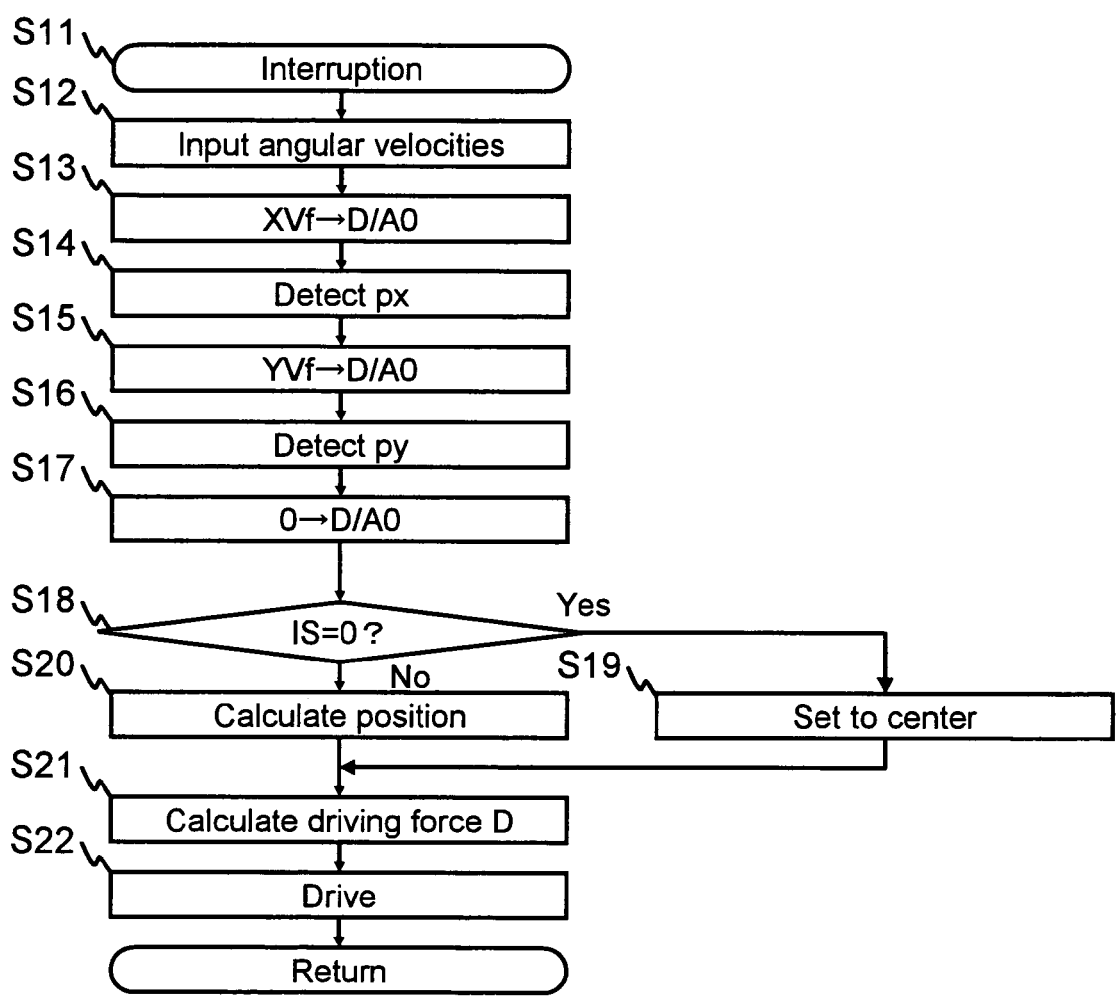
FIG. 12 is a flowchart of the anti-shake operation, which is performed at every predetermined time interval, as an interruption process.

Next, the flow of the anti-shake operation, which is performed at every predetermined time interval (1 ms) as an interruption process, independently of the other operations, is explained by using the flowchart in FIG. 12.

In step S11, the interruption process for the anti-shake operation is started. In step S12, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal.

In step S13, the first voltage XVf is applied to the input terminals of the horizontal hall element hh10 from the D/A converter D/A 0 of the CPU 21, so that current having the optimized horizontal hall-element current-value xDi, flows through the input terminals of the horizontal hall element hh10, through the circuit 456. At this time, current having the optimized horizontal hall-element current-value xDi, also flows through the input terminals of the vertical hall element hv10, because the input terminal of the horizontal hall element hh10 and the input terminal of the vertical hall element hv10 are connected in series.

In step S14, the position of the movable unit 30a in the first direction x is detected by the horizontal hall element hh10 of the hall element unit 44a, so that the first detected-position signal px, which is calculated by the hall-element signal-processing unit 45, is input to the A/D converter A/D 2 of the CPU 21 and is converted to a digital signal. Therefore, the present position of the movable unit 30a in the first direction x, in other words pdx is determined.

In step S15, the second voltage YVf is applied to the input terminals of the vertical hall element hv10 from the D/A converter D/A 0 of the CPU 21, so that current having the optimized vertical hall-element current-value yDi, flows through the input terminals of the vertical hall element hv10, through the circuit 456. At this time, current having the optimized vertical hall-element current-value yDi, also flows through the input terminals of the horizontal hall element hh10, because the input terminal of the horizontal hall element hh10 and the input terminal of the vertical hall element hv10 are connected in series.

In step S16, the position of the movable unit 30a in the second direction y is detected by the vertical hall element hv10 of the hall element unit 44a, so that the second detected-position signal py, which is calculated by the hall-element signal-processing unit 45, is input to the A/D converter A/D 3 of the CPU 21 and is converted to a digital signal. Therefore, the present position of the movable unit 30a in the second direction y, in other words pdy is determined, so that the present position of the movable unit 30a P (pdx, pdy) is determined.

In step S17, the output value from the D/A converter D/A 0 of the CPU 21 is set to 0, in other words the application of voltage is stopped.

In step S18, it is judged whether the value of the IS is 0. When it is judged that the value of the IS is 0 (IS=0), in other words in the non anti-shake mode, the position S (sx, sy) of the movable unit 30a (the imaging unit 39a), which should be moved to, is set to the center of its movement range, in step S19. When it is judged that the value of the IS is not 0 (IS=1), in other words in the anti-shake mode, the position S (sx, sy) of the movable unit 30a (the imaging unit 39a), which should be moved to, is calculated on the basis of the first and second angular velocities vx and vy, in step S20.

In step S21, the driving force D, which drives the driver circuit 29 in order to move the movable unit 30a to the position S, in other words the first PWM duty dx and the second PWM duty dy, is calculated on the basis of the position S (sx, sy), which is determined in step S19 or step S20, and the present position P (pdx, pdy).

In step S22, the first driving coil 31a is driven by using the first PWM duty dx through the driver circuit 29, and the second driving coil 32a is driven by using the second PWM duty dy through the driver circuit 29, so that the movable unit 30a is moved.

The process in steps S21 and S22 is an automatic control calculation, which is used with the PID automatic control for performing general (normal) proportional, integral, and differential calculations.

Figure 13:
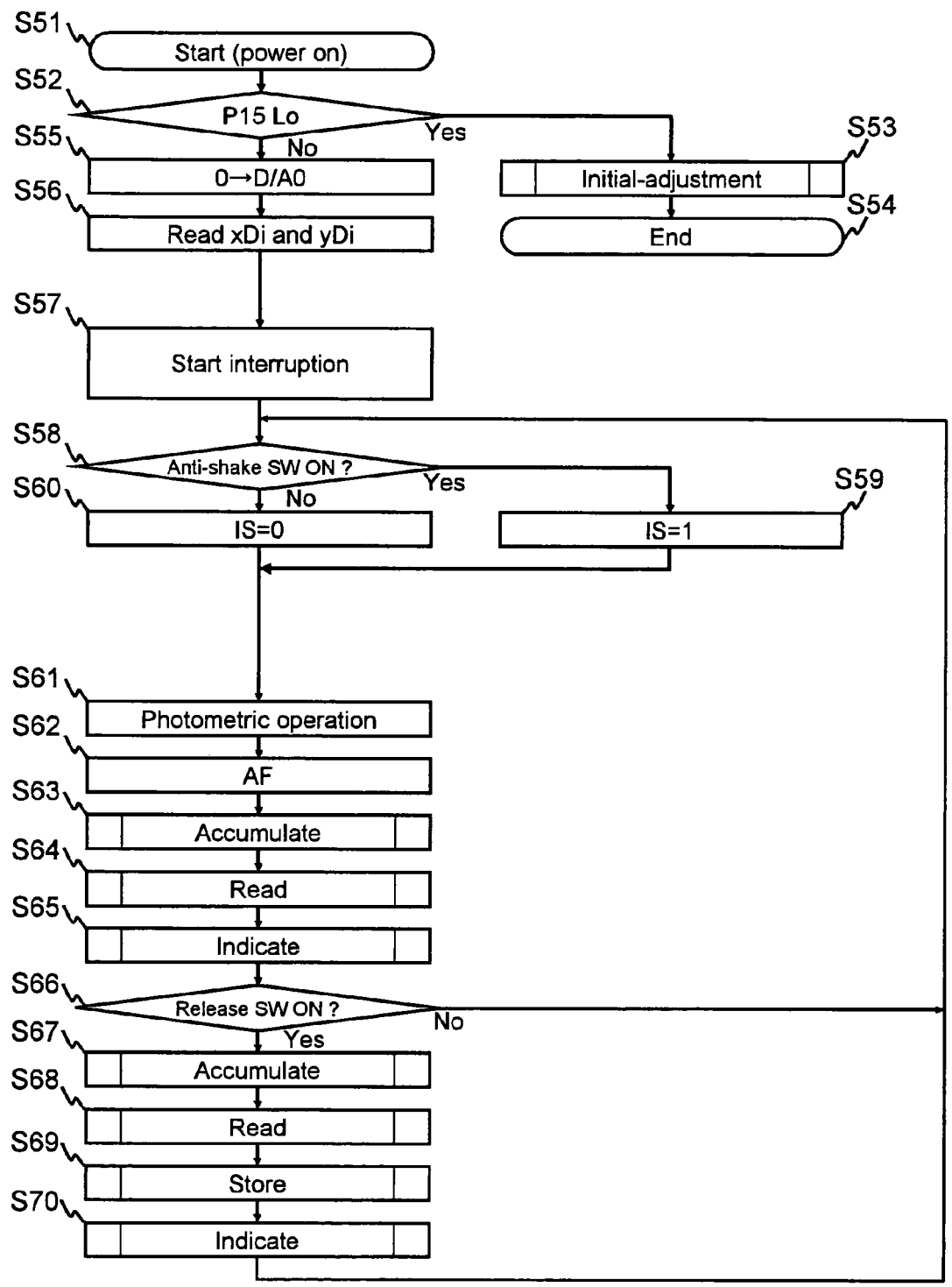
FIG. 13 is a flowchart that shows the imaging operation.

Next, the imaging operation of the photographing apparatus 1 is explained by using the flowchart in FIG. 13.

In step S51, the Pon switch 11a is set to the on state, so that the photographing apparatus 1 is set to the on state (power on). In step S52, it is judged whether the output signal to the port P15 of the CPU 21, from the adjusting unit 71, is the Lo signal.

When it is judged that the Lo signal is output from the adjusting unit 71 to the port P15 of the CPU 21, the initial-adjustment operation (the first and second initial-adjustment operations) is performed which is described by using the flowcharts in FIGS. 10 and 11, in step S53. In step S54, the initial-adjustment operation is finished.

When it is judged that the Lo signal is not output from the adjusting unit 71 to the port P15 of the CPU 21 in step S52, the output value from the D/A converter D/A 0 of the CPU 21 is set to 0, in step S55. The optimized horizontal hall-element current-value xDi and the optimized vertical hall-element current-value yDi are read from the memory unit 72 through the port P6 of the CPU 21, in step S56.

In step S57, the anti-shake operation, which is explained by using the flowchart in FIG. 12, is performed at every predetermined time interval (1 ms) as an interruption process, independently of the other operations (steps S58 to S70).

In step S58, it is judged whether the anti-shake switch 14a is in the on state. When it is judged that the anti-shake switch 14a is in the on state, the parameter IS is set to 1 (IS=1), in step S59. When it is judged that the anti-shake switch 14a is not in the on state (off state), the parameter IS is set to 0 (IS=0), in step S60.

In step S61, the photometric switch 12a is set to the on state, so that an AE sensor of the AE unit 23 is driven, the photometric operation is performed, and the aperture value and the exposure time are calculated. In step S62, an AF sensor of the AF unit 24 is driven, the AF sensing is performed, and the focusing operation is performed, by driving a lens control circuit of the AF unit 24.

In step S63, the exposure operation, in other words electric charge accumulation of the imaging device 39a1, is performed.

In step S64, the electric charge which is accumulated in the imaging device 39a1 in the exposure time is read, so that, in step S65, the electric charge which is read is indicated on the LCD monitor 17, as the image signal which is imaged by the imaging block 22.

In step S66, it is judged whether the release switch 13a is in the on state. When it is judged that the release switch 13a is not in the on state, the flow is returned to step S58, so that the imaging operation is repeatedly performed. When it is judged that the release switch 13a is in the on state, the exposure operation, in other words electric charge accumulation of the imaging device 39a1, is performed, in step S67.

In step S68, the electric charge which is accumulated in the imaging device 39a1 in the exposure time is read, so that, in step S69, the electric charge which is read is stored in the memory of the photographing apparatus 1, as the image signal which is imaged by the imaging block 22. In step S70, the image signal which is stored, is indicated on the LCD monitor 17. After that, the flow is returned to step S58, so that the imaging operation is repeatedly performed.

In this way, the size of the circuit of the hall-element signal-processing unit 45 can be reduced, and the position detecting operation in the first direction x for the movable unit 30a can be performed where the detecting-resolution is adjusted (the first detecting-resolution), and the position detecting operation in the second direction y for the movable unit 30a can be performed where the detecting-resolution is adjusted (the second detecting-resolution).

Figure 14:
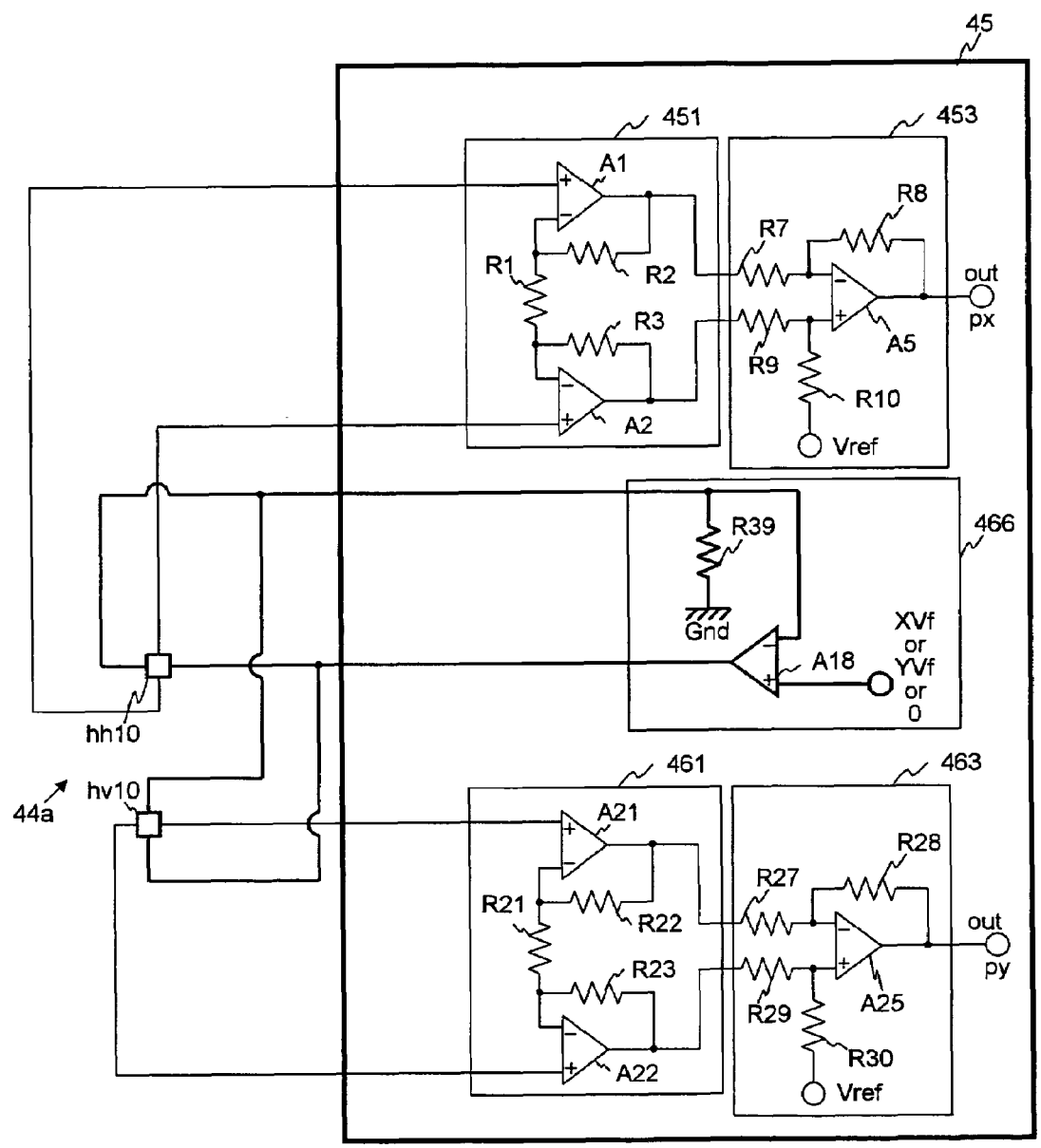
FIG. 14 is a circuit construction diagram of the circuit for the one-axis hall element and the hall-element signal-processing circuit, in the second embodiment.

Next, the second embodiment is explained. In the second embodiment, the hall-element signal-processing unit 45 has a circuit 466 instead of the circuit 456 in the first embodiment. The connection between the circuit 466 and the horizontal and vertical hall elements hh10 and hv10 in the second embodiment is different from the connection between the circuit 456 and the horizontal and vertical hall elements hh10 and hv10 in the first embodiment (see FIG. 14).

The circuit 466 has a resistor R39 and an operational amplifier A18. The operational amplifier A18 has an inverting input terminal, a non-inverting input terminal, and an output terminal.

The inverting input terminal of the operational amplifier A18 is connected with the resistor R39, and one of the input terminals of the horizontal hall element hh10, and one of the input terminals of the vertical hall element hv10.

The output terminal of the operational amplifier A18 is connected with the other input terminal of the horizontal hall element hh10 and with the other input terminal of the vertical hall element hv10. One of the terminals of the resistor R39 is grounded. The input terminal of the horizontal hall element hh10 is connected in parallel with the input terminal of the vertical hall element hv10.

The potential of the non-inverting input terminal of the operational amplifier A18 is set at the first voltage XVf corresponding to the optimized horizontal hall-element current-value xDi which flows through the input terminals of the horizontal hall element hh10, or at the second voltage YVf corresponding to the optimized vertical hall-element current-value yDi which flows through the input terminals of the vertical hall element hv10, or 0.

The value of the first voltage XVf is obtained by multiplying the product of the optimized horizontal hall-element current-value xDi and the value of the resistor R39, by 2, so that the value of the second voltage YVf is obtained by multiplying the product of the optimized vertical hall-element current-value yDi and the value of the resistor R39, by 2.

The other constructions and effects of the photographing apparatus 1 in the second embodiment are the same as those in the first embodiment.

In the first and second embodiments, it is explained that the hall element unit 44a has one horizontal hall element hh10 for detecting the first location in the first direction x of the movable unit 30a, and has one vertical hall element hv10 for detecting the second location in the second direction y of the movable unit 30a. However, the number of hall elements is not limited to this.

Even if the hall element unit 44a has a plurality of horizontal hall elements for detecting the first location in the first direction x of the movable unit 30a, or has a plurality of vertical hall elements for detecting the second location in the second direction y of the movable unit 30a, it is possible to reduce the size of the circuit of the hall-element signal-processing unit by sharing the electrical power circuit which supplies power to the input terminals of the horizontal hall elements and the vertical hall elements.

In the first and second embodiments, the first position-detecting and driving magnet 411b is one body in order to detect the first location in the first direction x of the movable unit 30a, and drive the movable unit 30a in the first direction x. However a magnet for detecting the first location and a magnet for driving the movable unit 30a in the first direction x, may be separated.

Similarly, the second position-detecting and driving magnet 412b is one body in order to detect the second location in the second direction y of the movable unit 30a, and drive the movable unit 30a in the second direction y. However a magnet for detecting the second location and a magnet for driving the movable unit 30a in the second direction y, may be separated.

Further, it is explained that the hall element unit 44a is attached to the movable unit 30a and the position-detecting magnets (the first and second position-detecting and driving magnets 411b and 412b) are attached to the fixed unit 30b, however the hall element unit may be attached to the fixed unit and position-detecting magnets may be attached to the movable unit.

Further, it is explained that the movable unit 30a has the imaging device 39a1. However, the movable unit 30a may have a hand-shake correcting lens instead of the imaging device.

Further, it is explained that the hall element is used for position-detecting as the magnetic-field change-detecting element, however, another detecting element may be used for position-detecting. Specifically, the detecting element may be an MI (Magnetic Impedance) sensor, in other words a high-frequency carrier-type magnetic-field sensor, or a magnetic resonance-type magnetic-field detecting element, or an MR (Magneto-Resistance effect) element. When one of the MI sensor, the magnetic resonance-type magnetic-field detecting element, and the MR element is used, the information regarding the position of the movable unit can be obtained by detecting the magnetic-field change, similar to using the hall element.

Although these embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2004-065047 (filed on Mar. 9, 2004), which is expressly incorporated herein by reference, in its entirety.

The invention claimed is:

1. An anti-shake apparatus of a photographing apparatus, comprising:

a movable unit that has one of an imaging device and a hand-shake correcting lens, and that can be moved in first and second directions, said first direction being perpendicular to an optical axis of a camera lens of said photographing apparatus, and said second direction being perpendicular to said optical axis and said first direction;

a fixed unit that slidably supports said movable unit in both said first and second directions;

a signal-processing unit; and a control unit that controls said movable unit, said fixed unit, and said signal-processing unit, and that has an A/D converter; wherein one of said movable unit and said fixed unit has a magnetic-field change-detecting unit which has a horizontal magnetic-field change-detecting element for detecting a position of said movable unit in said first direction as a first location, and a vertical magnetic-field change-detecting element for detecting a position of said movable unit in said second direction as a second location;

said signal-processing unit outputs a first detected-position signal, which specifies said first location on the basis of output signals of said horizontal magnetic-field change-detecting element, and outputs a second detected-position signal, which specifies said second location on the basis of output signals of said vertical magnetic-field change-detecting element, and has a common input circuit which supplies electrical power to input terminals of said horizontal and vertical magnetic-field change-detecting elements;

said control unit calculates said first location on the basis of an A/D converting operation by said A/D converter, for said first detected-position signal, and calculates said second location on the basis of an A/D converting operation by said A/D converter, for said second detected-position signal, and performs first and second initial-adjustment operations;

in said first initial-adjustment operation, the width between the minimum and maximum values of said first detected-position signal is maximized, in the movement range of said movable unit, and in the A/D converting range of said A/D converter;

in said second initial-adjustment operation, the width between the minimum and maximum values of said second detected-position signal is maximized, in the movement range of said movable unit, and in the A/D converting range of said A/D converter;

an optimized horizontal current-value for the current, which flows through said input terminals of said horizontal magnetic-field change-detecting element when detecting said first location, is calculated in said first initial-adjustment operation, which adjusts a first detecting-resolution when said first detected-position signal is A/D converted by said A/D converter, by changing the value of the current which flows through the input terminals of said horizontal magnetic-field change-detecting element; and an optimized vertical current-value for the current, which flows through said input terminals of said vertical magnetic-field change-detecting element when detecting said second location, is calculated in said second initial-adjustment operation, which adjusts a second detecting-resolution when said second detected-position signal is A/D converted by said A/D converter, by changing the value of the current which flows through the input terminals of said vertical magnetic-field change-detecting element.

2. The anti-shake apparatus according to claim 1, wherein the input terminal of said horizontal magnetic-field change-detecting element is connected with the input terminal of said vertical magnetic-field change-detecting element in series.

3. The anti-shake apparatus according to claim 1, wherein the input terminal of said horizontal magnetic-field change-detecting element is connected in parallel with the input terminal of said vertical magnetic-field change-detecting element.

4. The anti-shake apparatus according to claim 1, wherein said movable unit has said magnetic-field change-detecting unit;

said magnetic-field change-detecting unit has one said horizontal magnetic-field change-detecting element and one said vertical magnetic-field change-detecting element; and said fixed unit has a position-detecting magnet unit which has a first position-detecting magnet which is used for detecting said first location and faces said horizontal magnetic-field change-detecting element, and a second position-detecting magnet which is used for detecting said second location and faces said vertical magnetic-field change-detecting element.

5. The anti-shake apparatus according to claim 4, wherein said movable unit has a first driving coil which is used for moving said movable unit in said first direction, and a second driving coil which is used for moving said movable unit in said second direction;

said first position-detecting magnet is used for moving said movable unit in said first direction; and said second position-detecting magnet is used for moving said movable unit in said second direction.

6. The anti-shake apparatus according to claim 1, wherein said optimized horizontal current-value is the smaller value of first and second horizontal current-values;

said optimized vertical current-value is the smaller value of first and second vertical current-values;

said first horizontal current-value is the value of the current which flows through said input terminals of said horizontal magnetic-field change-detecting element, when the output value of said first detected-position signal is the same as the maximum value in the A/D converting range of said A/D converter, when said movable unit contacts a first horizontal edge-point which is one of the edge-points in a movement range of said movable unit in said first direction;

said second horizontal current-value is the value of the current which flows through said input terminals of said horizontal magnetic-field change-detecting element, when the output value of said first detected-position signal is the same as the minimum value in the A/D converting range of said A/D converter, when said movable unit contacts a second horizontal edge-point which is another of the edge-points in said movement range of said movable unit, in said first direction;

said first vertical current-value is the value of the current which flows through said input terminals of said vertical magnetic-field change-detecting element, when the output value of said second detected-position signal is the same as the maximum value in the A/D converting range of said A/D converter, when said movable unit contacts a first vertical edge-point which is one of the edge-points in a movement range of said movable unit, in said second direction; and said second vertical current-value is the value of the current which flows said input terminals of said vertical magnetic-field change-detecting element, when the output value of said second detected-position signal is the same as the minimum value in the A/D converting range of said A/D converter when said movable unit contacts a second vertical edge-point which is another of the edge-points in said movement range of said movable unit in said second direction.

7. The anti-shake apparatus according to claim 1, further comprising a memory unit that is connected with said control unit, and stores said optimized horizontal current-value and said optimized vertical current-value;

a content which is stored in said memory unit is not deleted even if said memory unit is set to the off state.

8. The anti-shake apparatus according to claim 1, wherein current having said optimized horizontal current-value, flows through said input terminals of said horizontal and vertical magnetic-field change-detecting elements, from said control unit, through said common input circuit, when detecting said first location; and current having said optimized vertical current-value, flows through said input terminals of said horizontal and vertical magnetic-field change-detecting elements, from said control unit, through said common input circuit, when detecting said second location.

9. The anti-shake apparatus according to claim 1, wherein said control unit has first and second A/D converters;
   said A/D converting operation for said first detected-position signal is performed by said first A/D converter; and
   said A/D converting operation for said second detected-position signal is performed by said second A/D converter.

10. The anti-shake apparatus according to claim 1, wherein said magnetic-field change-detecting unit is a one-axis hall element; and
   said horizontal magnetic-field change-detecting element and said vertical magnetic-field change-detecting element are hall elements.

* * * * *